(12) United States Patent
Royzner

(10) Patent No.: US 10,387,513 B2
(45) Date of Patent: Aug. 20, 2019

(54) METHOD AND APPARATUS FOR GENERATING A RECOMMENDED CONTENT LIST

(71) Applicant: YANDEX EUROPE AG, Lucerne (CH)

(72) Inventor: Mikhail Aleksandrovich Royzner, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 189 days.

(21) Appl. No.: 15/236,538

(22) Filed: Aug. 15, 2016

(65) Prior Publication Data

US 2017/0061021 A1    Mar. 2, 2017

(30) Foreign Application Priority Data

Aug. 28, 2015  (RU) ................ 2015136684

(51) Int. Cl.
*G06F 16/9535* (2019.01)
*G06N 20/00* (2019.01)

(52) U.S. Cl.
CPC ......... *G06F 16/9535* (2019.01); *G06N 20/00* (2019.01)

(58) Field of Classification Search
CPC .................. G06F 17/30867; G06F 16/9535
USPC .................................................. 707/667
See application file for complete search history.

(56) References Cited

U.S. PATENT DOCUMENTS

| 7,007,242 | B2 | 2/2006 | Suomela et al. |
| 7,328,216 | B2 | 2/2008 | Hofmann et al. |
| 7,502,789 | B2 | 3/2009 | Yao et al. |
| 7,540,051 | B2 | 6/2009 | Gundersen et al. |
| D613,300 | S | 4/2010 | Chaudhri |
| 7,849,076 | B2 | 12/2010 | Zheng et al. |

(Continued)

FOREIGN PATENT DOCUMENTS

| CN | 103077220 A | 5/2013 |
| CN | 103167330 A | 6/2013 |

(Continued)

OTHER PUBLICATIONS

European Examination Report with regard to the counterpart patent application No. EP 16190999.9 dated Jun. 29, 2018.

(Continued)

*Primary Examiner* — Joshua Bullock
(74) *Attorney, Agent, or Firm* — BCF LLP

(57) ABSTRACT

There is disclosed a method for generating a content recommendation for a given user of a recommendation system. The method comprises: receiving a request for the content recommendation; responsive to the request generating a set of content recommendations for the given user, the generating being executed by a prediction module of the recommendation server, the prediction module having been trained using a training set of training events, such that for each given training event from the training set of training events: at least one user-nonspecific feature is used as a first input parameter for the prediction module training, the at least one user-nonspecific feature having been retrieved from a latest version of a snapshot archive available at a time of the given training event occurring; and at least one user-specific feature is used as a second input parameter for the prediction module training.

14 Claims, 9 Drawing Sheets

(56) References Cited

U.S. PATENT DOCUMENTS

| | | |
|---|---|---|
| 8,010,527 B2 | 8/2011 | Denoue et al. |
| 8,244,740 B2 | 8/2012 | Gruenhagen et al. |
| 8,271,898 B1 | 9/2012 | Mattos et al. |
| 8,285,602 B1 | 10/2012 | Yi et al. |
| 8,290,818 B1 | 10/2012 | Levitan et al. |
| 8,301,623 B2 | 10/2012 | Chakrabarti et al. |
| 8,386,955 B1 | 2/2013 | Weber et al. |
| 8,412,726 B2 | 4/2013 | Yan et al. |
| 8,429,184 B2 | 4/2013 | Ismalon |
| 8,478,664 B1 | 7/2013 | Xavier et al. |
| 8,510,252 B1 | 8/2013 | Gargi et al. |
| D693,833 S | 11/2013 | Inose et al. |
| 8,600,968 B2 | 12/2013 | Holenstein et al. |
| 8,606,792 B1 | 12/2013 | Jackson et al. |
| 8,676,736 B2 | 3/2014 | Pilaszy et al. |
| 8,683,374 B2 | 3/2014 | Vaughan et al. |
| 8,712,937 B1 | 4/2014 | Bacus et al. |
| 8,751,507 B2 | 6/2014 | Kim et al. |
| 8,869,042 B2 | 10/2014 | Kast |
| 8,886,797 B2 | 11/2014 | Gannu et al. |
| 8,893,042 B2 | 11/2014 | Laurie et al. |
| 8,893,043 B2 | 11/2014 | Dodson et al. |
| 8,903,834 B2 | 12/2014 | Ciancutti et al. |
| 8,910,070 B2 | 12/2014 | Goodger et al. |
| 8,914,399 B1 | 12/2014 | Paleja et al. |
| 8,972,865 B2 | 3/2015 | Hansen et al. |
| 8,983,888 B2 | 3/2015 | Nice et al. |
| 8,996,530 B2 | 3/2015 | Luvogt et al. |
| 9,053,416 B1 | 6/2015 | De Leo et al. |
| 9,098,248 B2 | 8/2015 | Suzuki et al. |
| 9,122,989 B1 | 9/2015 | Morris et al. |
| 9,348,898 B2 | 5/2016 | Nice et al. |
| 9,405,741 B1 | 8/2016 | Schaaf et al. |
| 9,473,803 B2 | 10/2016 | Wang |
| 9,569,785 B2 * | 2/2017 | Alon ............... G06Q 30/0202 |
| 9,660,947 B1 | 5/2017 | Hart |
| 9,785,883 B2 | 10/2017 | Luvogt et al. |
| 9,836,533 B1 | 12/2017 | Levi et al. |
| 9,836,765 B2 | 12/2017 | Hariri et al. |
| 9,900,659 B1 | 2/2018 | Norum et al. |
| 2002/0054164 A1 | 5/2002 | Uemura |
| 2002/0198882 A1 | 12/2002 | Linden et al. |
| 2004/0158497 A1 | 8/2004 | Brand |
| 2004/0260621 A1 | 12/2004 | Foster et al. |
| 2005/0076365 A1 | 4/2005 | Popov et al. |
| 2005/0097190 A1 | 5/2005 | Abdelhak |
| 2006/0031114 A1 | 2/2006 | Zommers |
| 2006/0041548 A1 | 2/2006 | Parsons et al. |
| 2006/0293065 A1 | 12/2006 | Chew et al. |
| 2008/0222132 A1 | 9/2008 | Pan et al. |
| 2008/0250039 A1 | 10/2008 | Franks et al. |
| 2008/0256017 A1 | 10/2008 | Murakami |
| 2008/0266289 A1 | 10/2008 | Park |
| 2008/0294617 A1 * | 11/2008 | Chakrabarti ...... G06F 17/30867 |
| 2009/0006371 A1 | 1/2009 | Denoue |
| 2009/0006373 A1 * | 1/2009 | Chakrabarti ...... G06F 17/30699 |
| 2009/0055385 A1 | 2/2009 | Jeon et al. |
| 2009/0150935 A1 | 6/2009 | Peters et al. |
| 2009/0163183 A1 | 6/2009 | O'Donoghue et al. |
| 2009/0249217 A1 | 10/2009 | Narayanaswami |
| 2009/0276368 A1 * | 11/2009 | Martin ................ G06Q 40/02 |
| | | 705/36 R |
| 2009/0327941 A1 | 12/2009 | Fong et al. |
| 2010/0050067 A1 | 2/2010 | Curwen et al. |
| 2010/0070454 A1 | 3/2010 | Masuda et al. |
| 2010/0070928 A1 | 3/2010 | Goodger et al. |
| 2010/0131844 A1 | 5/2010 | Wohlert |
| 2010/0175018 A1 | 7/2010 | Petschnigg et al. |
| 2010/0205542 A1 | 8/2010 | Walman |
| 2010/0251304 A1 | 9/2010 | Donoghue et al. |
| 2010/0312650 A1 | 12/2010 | Pinckney et al. |
| 2010/0312724 A1 | 12/2010 | Pinckney et al. |
| 2011/0029636 A1 | 2/2011 | Smyth et al. |
| 2011/0035388 A1 | 2/2011 | Im et al. |
| 2011/0047136 A1 | 2/2011 | Dehn |
| 2011/0047491 A1 | 2/2011 | Hwang et al. |
| 2011/0066497 A1 | 3/2011 | Gopinath et al. |
| 2011/0072011 A1 | 3/2011 | Qiao |
| 2011/0107223 A1 | 5/2011 | Tilton et al. |
| 2011/0112981 A1 | 5/2011 | Park et al. |
| 2011/0179081 A1 | 7/2011 | Ovsjanikov et al. |
| 2011/0208732 A1 | 8/2011 | Melton et al. |
| 2011/0213761 A1 | 9/2011 | Song et al. |
| 2011/0246406 A1 | 10/2011 | Lahav et al. |
| 2011/0252050 A1 | 10/2011 | Palleti et al. |
| 2011/0258185 A1 * | 10/2011 | Acharya ........... G06F 17/30864 |
| | | 707/725 |
| 2011/0302117 A1 | 12/2011 | Pinckney et al. |
| 2011/0302158 A1 | 12/2011 | Sanders |
| 2011/0320450 A1 | 12/2011 | Liu et al. |
| 2012/0030159 A1 | 2/2012 | Pilaszy et al. |
| 2012/0054794 A1 | 3/2012 | Kim et al. |
| 2012/0059707 A1 | 3/2012 | Goenka et al. |
| 2012/0143871 A1 | 6/2012 | Liebald et al. |
| 2012/0158685 A1 | 6/2012 | White et al. |
| 2012/0191776 A1 | 7/2012 | Ruffner et al. |
| 2012/0209907 A1 | 8/2012 | Andrews et al. |
| 2012/0254097 A1 | 10/2012 | Flinn et al. |
| 2012/0304073 A1 | 11/2012 | Mandic et al. |
| 2012/0317104 A1 | 12/2012 | Radlinski et al. |
| 2013/0009990 A1 | 1/2013 | Hsu et al. |
| 2013/0024471 A1 | 1/2013 | Mitrovic |
| 2013/0031090 A1 | 1/2013 | Posse et al. |
| 2013/0041896 A1 | 2/2013 | Ghani et al. |
| 2013/0046772 A1 | 2/2013 | Gu et al. |
| 2013/0047112 A1 | 2/2013 | Waeller |
| 2013/0073988 A1 | 3/2013 | Groten et al. |
| 2013/0111395 A1 | 5/2013 | Ying et al. |
| 2013/0132515 A1 | 5/2013 | Mostafa et al. |
| 2013/0158693 A1 | 6/2013 | Beckmann et al. |
| 2013/0159243 A1 | 6/2013 | Wei et al. |
| 2013/0194308 A1 | 8/2013 | Privault et al. |
| 2013/0204737 A1 | 8/2013 | Agarwal et al. |
| 2013/0227054 A1 | 8/2013 | Zhang et al. |
| 2013/0262478 A1 | 10/2013 | Kemp et al. |
| 2013/0290110 A1 | 10/2013 | Luvogt et al. |
| 2013/0290905 A1 | 10/2013 | Luvogt et al. |
| 2013/0297698 A1 | 11/2013 | Odero et al. |
| 2013/0311408 A1 | 11/2013 | Bagga et al. |
| 2013/0346182 A1 | 12/2013 | Cheng et al. |
| 2013/0346234 A1 | 12/2013 | Hendrick et al. |
| 2014/0006399 A1 | 1/2014 | Vasudevan et al. |
| 2014/0025532 A1 * | 1/2014 | Huang ............... G06Q 30/0631 |
| | | 705/26.7 |
| 2014/0025609 A1 | 1/2014 | Coster et al. |
| 2014/0032678 A1 | 1/2014 | Koukoumidis et al. |
| 2014/0040776 A1 | 2/2014 | Dann et al. |
| 2014/0074856 A1 | 3/2014 | Rao et al. |
| 2014/0095967 A1 | 4/2014 | Cheng et al. |
| 2014/0101142 A1 | 4/2014 | Gomez et al. |
| 2014/0122605 A1 | 5/2014 | Merom et al. |
| 2014/0129500 A1 | 5/2014 | Nice et al. |
| 2014/0136528 A1 | 5/2014 | Anima et al. |
| 2014/0137013 A1 | 5/2014 | Matas |
| 2014/0143012 A1 | 5/2014 | Alon et al. |
| 2014/0143738 A1 | 5/2014 | Underwood et al. |
| 2014/0156681 A1 | 6/2014 | Lee et al. |
| 2014/0164365 A1 | 6/2014 | Graham |
| 2014/0172544 A1 | 6/2014 | Rabkin |
| 2014/0172545 A1 | 6/2014 | Rabkin |
| 2014/0181121 A1 | 6/2014 | Nice et al. |
| 2014/0189014 A1 | 7/2014 | Dolan et al. |
| 2014/0195890 A1 | 7/2014 | Taylor et al. |
| 2014/0201675 A1 | 7/2014 | Joo et al. |
| 2014/0250390 A1 | 9/2014 | Holmes et al. |
| 2014/0278786 A1 | 9/2014 | Liu-Qiu-Yan |
| 2014/0280080 A1 | 9/2014 | Solheim et al. |
| 2014/0280221 A1 | 9/2014 | Chuang et al. |
| 2014/0280565 A1 | 9/2014 | Grewal |
| 2014/0298263 A1 | 10/2014 | Maeda et al. |
| 2014/0316930 A1 | 10/2014 | Jain et al. |
| 2014/0317105 A1 | 10/2014 | Jain et al. |
| 2014/0358916 A1 | 12/2014 | Anand et al. |
| 2014/0359489 A1 | 12/2014 | Zhao et al. |

(56) References Cited

U.S. PATENT DOCUMENTS

| | | |
|---|---|---|
| 2014/0365853 A1 | 12/2014 | Kleinhout et al. |
| 2014/0365854 A1 | 12/2014 | Karunamuni et al. |
| 2014/0379893 A1 | 12/2014 | Kannan et al. |
| 2015/0006286 A1 | 1/2015 | Liu et al. |
| 2015/0052003 A1 | 2/2015 | Tang et al. |
| 2015/0066643 A1 | 3/2015 | Choi et al. |
| 2015/0088921 A1 | 3/2015 | Somaiya et al. |
| 2015/0100587 A1 | 4/2015 | Walkingshaw et al. |
| 2015/0112801 A1 | 4/2015 | Nice et al. |
| 2015/0120712 A1 | 4/2015 | Yi et al. |
| 2015/0120722 A1 | 4/2015 | Martin et al. |
| 2015/0154197 A1 | 6/2015 | Lightner et al. |
| 2015/0161256 A1 | 6/2015 | Jeh |
| 2015/0161672 A1 | 6/2015 | Jung et al. |
| 2015/0178282 A1 | 6/2015 | Gorur et al. |
| 2015/0189070 A1 | 7/2015 | Baker |
| 2015/0242492 A1 | 8/2015 | Bhatt et al. |
| 2015/0269370 A1 | 9/2015 | Phillips |
| 2015/0269488 A1 | 9/2015 | Galai et al. |
| 2015/0278706 A1 | 10/2015 | Shivashankar et al. |
| 2015/0312348 A1 | 10/2015 | Lustgarten |
| 2015/0325094 A1 | 11/2015 | Cheng et al. |
| 2015/0330805 A1* | 11/2015 | Cho .................. G01C 21/3484 701/428 |
| 2015/0331859 A1 | 11/2015 | Raichelgauz et al. |
| 2015/0331951 A1 | 11/2015 | Wang et al. |
| 2015/0347358 A1 | 12/2015 | Shultz et al. |
| 2015/0370798 A1 | 12/2015 | Ju et al. |
| 2015/0378707 A1 | 12/2015 | Park et al. |
| 2015/0379146 A1 | 12/2015 | Tonse et al. |
| 2016/0004394 A1 | 1/2016 | MacAdaan et al. |
| 2016/0055242 A1 | 2/2016 | Bradic et al. |
| 2016/0063065 A1 | 3/2016 | Khatri et al. |
| 2016/0070803 A1 | 3/2016 | Nuckolls |
| 2016/0110363 A1 | 4/2016 | Tkach et al. |
| 2016/0112760 A1 | 4/2016 | Kosseifi et al. |
| 2016/0147753 A1 | 5/2016 | Dimson et al. |
| 2016/0154887 A1 | 6/2016 | Zhao |
| 2016/0170982 A1 | 6/2016 | Djuric et al. |
| 2016/0196244 A1 | 7/2016 | Greenberg et al. |
| 2016/0275804 A1 | 9/2016 | Koppel et al. |
| 2016/0299992 A1 | 10/2016 | Cetintas et al. |
| 2016/0328480 A1 | 11/2016 | Owens et al. |
| 2016/0350812 A1 | 12/2016 | Priness et al. |
| 2016/0371274 A1 | 12/2016 | Ng et al. |
| 2017/0011112 A1 | 1/2017 | Jing et al. |
| 2017/0017369 A1 | 1/2017 | Kanter et al. |
| 2017/0024391 A1 | 1/2017 | Steck |
| 2017/0024657 A1 | 1/2017 | Sahu et al. |
| 2017/0060870 A1 | 3/2017 | Checkley |
| 2017/0060872 A1 | 3/2017 | Sacheti et al. |
| 2017/0061014 A1 | 3/2017 | Heiler et al. |
| 2017/0061286 A1 | 3/2017 | Kumar et al. |
| 2017/0068992 A1 | 3/2017 | Chen et al. |
| 2017/0076318 A1 | 3/2017 | Goswami et al. |
| 2017/0083965 A1 | 3/2017 | Sun |
| 2017/0091194 A1 | 3/2017 | Spiegel |
| 2017/0103343 A1 | 4/2017 | Yee et al. |
| 2017/0132230 A1 | 5/2017 | Muralidhar et al. |
| 2017/0293865 A1 | 10/2017 | Sandler |
| 2017/0337612 A1 | 11/2017 | Galron et al. |
| 2018/0011937 A1 | 1/2018 | Tikhonov |
| 2018/0014038 A1 | 1/2018 | Lamburt et al. |
| 2018/0075137 A1 | 3/2018 | Lifar |

FOREIGN PATENT DOCUMENTS

| | | |
|---|---|---|
| CN | 103473354 A | 12/2013 |
| CN | 103559262 A | 2/2014 |
| CN | 103678672 A | 3/2014 |
| CN | 103838842 A | 6/2014 |
| CN | 103942288 A | 7/2014 |
| CN | 104102696 A | 10/2014 |
| CN | 104317835 A | 1/2015 |
| CN | 104503973 A | 4/2015 |
| CN | 104636371 A | 5/2015 |
| CN | 303532062 S | 12/2015 |
| CN | 105893398 A | 8/2016 |
| CN | 106446195 A | 2/2017 |
| CN | 106777229 A | 5/2017 |
| CN | 106802915 A | 6/2017 |
| CN | 106815297 A | 6/2017 |
| CN | 106874374 A | 6/2017 |
| CN | 107491813 A | 12/2017 |
| EP | 3032780 A | 6/2016 |
| JP | 2009015834 A | 1/2009 |
| JP | 2015079395 A | 4/2015 |
| KR | 20160064447 A | 6/2016 |
| RU | 2368006 C1 | 9/2009 |
| RU | 2419858 C2 | 5/2011 |
| RU | 2451986 C2 | 11/2011 |
| RU | 2509341 C2 | 3/2014 |
| RU | 2523930 C2 | 7/2014 |
| RU | 2013101601 A | 7/2014 |
| RU | 2543315 C2 | 2/2015 |
| RU | 2577193 C2 | 3/2016 |
| WO | 2002052374 A2 | 7/2002 |
| WO | 2009087414 A1 | 7/2009 |
| WO | 2013010698 A1 | 1/2013 |
| WO | 2013189738 A1 | 12/2013 |
| WO | 2014141078 A1 | 9/2014 |

OTHER PUBLICATIONS

Russian Search Report from RU patent application No. 2015141108 dated Sep. 7, 2016.
U.S. Appl. No. 15/607,555, filed May 29, 2017.
U.S. Appl. No. 15/606,658, filed May 26, 2017.
U.S. Appl. No. 15/606,326, filed May 26, 2017.
U.S. Appl. No. 15/592,745, filed May 11, 2017.
U.S. Appl. No. 29/590,781, filed Jan. 13, 2017.
U.S. Appl. No. 15/262,332, filed Sep. 12, 2016.
Russian Search Report from RU patent application No. 2015141291 dated Nov. 2, 2016.
Extended European Search Report from EP16190997, dated Feb. 16, 2017, Herry, Tzvetanka.
U.S. Appl. No. 15/262,318, filed Sep. 12, 2016.
U.S. Appl. No. 15/263,493, filed Sep. 13, 2016.
Pilaszy et al., "Fast ALS-based Matrix Factorization for Explicit and Implicit Feedback Datasets", RECSYS'10, 2010, pp. 71-78.
Russian Search Report from RU patent application No. 2016127447 dated Feb. 7, 2017.
Kim et al., "Ranking Web Documents with Dynamic Evaluation by Expert Groups", J. Eder and M. Missikoff (Eds.), CAISE, 2003, pp. 437-448.
English Abstract of CN303532062 retrieved on Google Translate on Apr. 4, 2017.
Kumar Kar et al., "Knowledge Retrieval from Web Server Logs Using Web Usage Mining", International Journal of Science and Research (IJSR), 2015, vol. 4, Issue 3, pp. 2173-2176.
Russian Search Report dated Nov. 9, 2016 from Russian Patent Application No. 2015136684.
European Search report from EP 16185747, Siodmok, Wojciech, dated Jan. 18, 2017.
Amatriain et al, System Architectures for Personalization and Recommendation, http://techblog.netflix.com/2013/03/system-architectures-for.html, retrieved on May 30, 2015.
European Search Report dated Dec. 11, 2017 with regard to the counterpart patent application EP 17 18 9557.
Xiao et al., "Research and Implementation of Hybrid Recommendation Algorithm Based on Collaborative Filtering and Word2Vec", 8th International Symposium on Computational Intelligence and Design, 2015, pp. 172-175.
Koren et al., "Matrix Factorization Techniques for Recommender Systems", IEEE Computer Society, Computer, vol. 42, No. 8, 2009, pp. 42-49.
English abstract of CN103678672 retrieved from Espacenet on Jan. 20, 2017.

(56) References Cited

OTHER PUBLICATIONS

English abstract of CN103077220 retrieved from Espacenet on Jan. 20, 2017.
English abstract of CN 103838842 retrieved from Espacenet on Feb. 3, 2017.
Brunner, Don't panic: Mozilla will be incorporating ads into Firefox, http://www.extremetech.com/internet/176521-dont-panic-mozilla-will-be-incorporating-ads-into-firefox, Feb. 12, 2014, retrieved on Nov. 11, 2016.
Mozilla / newnewtab, https://github.com/mozilla/newnewtab, retrieved on Nov. 11, 2016, 2 pages.
Brinkmann, Mozilla adds Suggested Sites feature to New Tab Page, May 15, 2015, http://www.ghacks.net/2015/05/15/mozilla-adds-suggested-sites-feature-to-new-tab-page/, retrieved on Nov. 11, 2016, 17 pages.
Lee, Mozilla Labs, New Tab Site Suggestions, https://blog.mozilla.org/labs/2012/11/new-tab-site-suggestions/, Nov. 2, 2012, retrieved on Nov. 11, 2016, 5 pages.
Opera Help, Speed Dial, http://help.opera.com/Windows/12.10/en/speeddial.html, retrieved on Nov. 11, 2016, 2 pages.
Sams, Windows 10 build 10120: Microsoft introduces a 'new tab' page for Edge, https://www.neowin.net/news/windows-10-build-10120-microsoft-introduces-a-039new-tab039-page-for-edge, May 18, 2015, retrieved on Nov. 11, 2016, 4 pages.
European Search Report dated Sep. 14, 2017 with regard to the counterpart patent application EP 17 18 0212.
European Search Report dated Sep. 18, 2017 with regard to the counterpart patent application EP 17 18 0214.
RU Search Report (completion date: May 25, 2017) with regard to the counterpart patent application RU 2016127446.
English Abstract for RU2013101601 retrieved on Espacenet on Nov. 2, 2017.
English Abstract for CN104317835 retrieved on Espacenet on May 7, 2018.
English Abstract for CN105893398 retrieved on Espacenet on May 7, 2018.
English Abstract for CN106446195 retrieved on Espacenet on May 7, 2018.
English Abstract for KR20160064447 retrieved on Espacenet on May 7, 2018.
English Abstract for CN104102696 retrieved on Espacenet on May 8, 2018.
English Abstract for JP2015079395 retrieved on Espacenet on May 8, 2018.
English Abstract for CN106777229 retrieved on Espacenet on May 8, 2018.
English Abstract for CN103942288 retrieved on Espacenet on May 8, 2018.
English Abstract for CN103559262 retrieved on Espacenet on May 8, 2018.
English Abstract for CN106815297 retrieved on Espacenet on May 8, 2018.
English Abstract for CN106802915 retrieved on Espacenet on May 8, 2018.
English Abstract for CN107491813 retrieved on Espacenet on May 8, 2018.
English Abstract for CN104503973 retrieved on Espacenet on May 8, 2018.
English Abstract for CN106874374 retrieved on Espacenet on May 8, 2018.
English Abstract for CN104636371 retrieved on Espacenet on May 8, 2018.
Beemanapalli et al., "Incorporating Usage Information into Average-Clicks Algorithm", Lecture Notes in Computer Science, vol. 4811, 2007, pp. 21-35, https://link.springer.com/chapter/10.1007%2F978-3-540-77485-3_2.
English Abstract for CN103167330 retrieved on Espacenet on May 9, 2018.
Youtube Account: RnStore, "Zmags Demo", (May 19, 2011), times stamp 1:5413:56, 2:20/3:56, PDF Attached, URL: https://www.youtube.com/watch?v=AsBrLdoEJgA, received from USPTO on May 11, 2018 with regard to the U.S. Appl. No. 15/263,493.
Youtube Account: iappletech128, "Close Tabs in Safari by Swiping", (Oct. 20, 2013), time stamp 0:20-0:35/1 :18, PDF Attached, URL: https://www.youtube.com/watch?v=V8TTbYrFSmg, received from USPTO on May 11, 2018 with regard to the U.S. Appl. No. 15/263,493.
Youtube Account: macmostvideo, "Viewing Photos With the Finder (MacMost Now 612)", (Sep. 30, 2011), time stamp 2:05-2:25, PDF Attached, URL: https://www.youtube.com/watch?v=tYoJI6G7Hkg, received from USPTO on May 11, 2018 with regard to the U.S. Appl. No. 15/263,493.
Notice of Allowance with regard to the counterpart U.S. Appl. No. 15/262,332 dated Mar. 18, 2019.
English Abstract for JP2009015834 retrieved on Espacenet on Mar. 21, 2019.
Office Action with regard to the counterpart U.S. Appl. No. 15/262,318 dated Apr. 1, 2019.
Office Action with regard to the counterpart U.S. Appl. No. 15/592,745 dated Mar. 8, 2019.
Notice of Allowance with regard to the counterpart U.S. Appl. No. 15/592,745 dated Oct. 11, 2018.
Disclosed Anonymously, "System, Method and Computer Program Product for Generating a Relationship-Based Recommendation", Apr. 28, 2006, 21 pages (Notice of Allowance with regard to the counterpart U.S. Appl. No. 15/592,745 dated Oct. 11, 2018).
Jim Bainbridge et al., "IBM DB2 Web Query for I Tutorials", Apr. 13, 2017, 570 pages (Notice of Allowance with regard to the counterpart U.S. Appl. No. 15/592,745 dated Oct. 11, 2018).
Office Action with regard to the counterpart U.S. Appl. No. 15/263,493 dated Nov. 29, 2018.
Office Action with regard to the counterpart U.S. Appl. No. 15/262,332 dated Dec. 27, 2018.
English Abstract for CN103473354 retrieved on Espacenet on Jan. 4, 2019.
Office Action with regard to the counterpart U.S. Appl. No. 15/606,326 dated Dec. 19, 2018.
Office Action with regard to the counterpart U.S. Appl. No. 15/263,493 dated Sep. 20, 2018.
Office Action with regard to the counterpart U.S. Appl. No. 15/263,493 dated May 9, 2019.
Martin Beck, "Facebook Now Asks Why You're Hiding That Ad, To Better Target Them & Block Offensive Ones" (Sep. 11, 2014), Marketing Land, Social Media Marketing, Retrieved May 4, 2019, PDF Attached, https://marketingland.com/facebook-adjusts-news-feed-mix-suppress-ads-users-hide-99727 (Year: 2014).
Notice of Allowance received with regard to the counterpart U.S. Appl. No. 15/606,658 dated Jun. 26, 2019.

\* cited by examiner

METHOD AND APPARATUS FOR GENERATING A RECOMMENDED CONTENT LIST

CROSS-REFERENCE

The present application claims priority to Russian Patent Application No. 2015136684, filed Aug. 28, 2015, entitled "METHOD AND APPARATUS FOR GENERATING A RECOMMENDED CONTENT LIST", the entirety of which is incorporated herein by reference.

FIELD

The present technology relates to search engines in general and specifically to a method and apparatus for generating a recommended content list.

BACKGROUND

Various global or local communication networks (the Internet, the World Wide Web, local area networks and the like) offer a user a vast amount of information. The information includes a multitude of contextual topics, such as but not limited to, news and current affairs, maps, company information, financial information and resources, traffic information, games and entertainment related information. Users use a variety of client devices (desktop, laptop, notebook, smartphone, tablets and the like) to have access to rich content (like images, audio, video, animation, and other multimedia content from such networks).

The volume of available information through various Internet resources has grown exponentially in the past couple of years. Several solutions have been developed in order to allow a typical user to find the information that the user is looking for. One example of such a solution is a search engine. Examples of the search engines include GOOGLE™ search engine, YANDEX™ search engine, YAHOO!™ search engine and the like. The user can access the search engine interface and submit a search query associated with the information that the user is desirous of locating on the Internet. In response to the search query, the search engine provides a ranked list of search results. The ranked list of search results is generated based on various ranking algorithms employed by the particular search engine that is being used by the user performing the search. The overall goal of such ranking algorithms is to present the most relevant search results at the top of the ranked list, while less relevant search results would be positioned on less prominent positions of the ranked list of search results (with the least relevant search results being located towards the bottom of the ranked list of search results).

The search engines typically provide a good search tool for a search query that the user knows apriori that she/he wants to search. In other words, if the user is interested in obtaining information about the most popular destinations in Italy (i.e. a known search topic), the user could submit a search query: "The most popular destinations in Italy?" The search engine will then present a ranked list of Internet resources that are potentially relevant to the search query. The user can then browse the ranked list of search results in order to obtain information she/he is interested in as it related to places to visit in Italy. If the user, for whatever reason, is not satisfied with the uncovered search results, the user can re-run the search, for example, with a more focused search query, such as "The most popular destinations in Italy in the summer?", "The most popular destinations in the South of Italy?", "The most popular destinations for a romantic getaway in Italy?".

There is another approach that has been proposed for allowing the user to discover content and, more precisely, to allow for discovering and/or recommending content that the user may not be expressly interested in searching for. In a sense, such systems recommend content to the user without an express search request based on explicit or implicit interests of the user.

An example of such a system is a FLIPBOARD recommending system, which system aggregates and recommends content from various social networks. The FLIPBOARD recommending system presents the uncovered content in a "magazine style" format, where the user can "flip" through the pages with the recommended/aggregated content. The recommending system collects content from social media and other websites, presents it in magazine format, and allows users to "flip" through their social-networking feeds and feeds from websites that have partnered with the company, effectively "recommending" content to the user even though the user may not have expressly expressed her/his desire in the particular content.

In order to generate the ranked search results in a search engine system or a list of recommended resources in a typical recommending system, the respective system utilizes a machine learning algorithm to select search results and/or recommended content. There are several machine learning algorithms known in the art and utilized by search engines and/or recommendation systems. As is known, a typical machine learning algorithm is first "trained" using a training set (whether marked or unmarked) to generate a machine learning algorithm formula, which is then applied to determine at run time an output based on the system inputs.

SUMMARY

It is an object of the present technology to ameliorate at least some of the inconveniences present in the prior art.

Embodiments of the present technology have been developed based on developers' appreciation that for some tasks in a recommendation system, it may be useful to use a two step recommendation approach. In the two step recommendation approach—a main prediction module (utilizing a main prediction algorithm) that outputs a "final prediction" for user-item relevance scores—uses as an input (either for training and/or in use), among other things, predictions made by a preliminary prediction module (utilizing a preliminary prediction algorithm).

Developers appreciated that there exists a problem associated with using the two step approach. More specifically, the problem that arises with this approach is that when the main prediction module is trained on a training set partially, mostly or entirely consisting of the same training events which were used for training the preliminary prediction module, the quality of recommendations may suffer or at very best will not increase comparing to a one-step recommendation approach.

Developers of the present technology have further appreciated a problem associated with training a prediction system (the prediction system employing a two-step recommendation approach or a one-step recommendation approach) on features associated with a given event, which features are post-occurring relative to the time of the event (or in other words features that become available at a later point in time relative to the event). The quality may also decrease in those cases where training set for the main prediction module uses input features, which were not available (i.e. has not yet occurred or where not predicted) at the time when the training event actually happened. In other words, if the training is executed using an event and features that are post-occurring relative to the timing of the event, the system may develop "biased over-trust" towards such an event.

Embodiments of the present technology aim to address at least some of these identified problems (together or separately) by training a prediction module (the prediction module can be a single prediction module within a prediction system or part of multiple prediction modules in the prediction system) using user-nonspecific features that are calculated once in a given period of time (such as once a day, once every other day, once a week and the like) and stored in a so-called "snapshot archive". User-nonspecific features stored in the snapshot archive can be generated using a preliminary prediction module that is trained on the events which happened prior to the snapshot archive generation (i.e. only looking back, without "looking forward" vis-a-vis the training event). Alternatively, rather than storing user-nonspecific features, the system can store data that can be used to calculate the user-nonspecific features.

User-specific features are calculated in near real-time or in real-time (for example, in response to a training event in a training phase and/or a receipt of a request for a recommendation in an in-use phase), so that for each event in the system the user-specific features are generated at the time of the event occurring. User-specific features may also be generated at least in part by the preliminary prediction module (the same or a different one from the one that was used to generate the snapshot archive).

The prediction module is trained after the snapshot archive has been generated. During the training for each event, user-specific features available only at the moment of each training event (e.g. taken from the prior history of each user) and user-nonspecific features from the latest snapshot available at the moment of training event are used for training.

The prediction module can be trained on a training set of events including events for a larger period of time, during which several snapshot archives may have been generated. In in this case, for each training event the prediction module takes user-nonspecific features from the latest snapshot available at the moment of the event and the latest user-specific features generated at the moment of the event are used for training.

Broadly speaking, the training events can comprise any significant user-item events in the training system from which user-item relevance may be derived, for example—the user giving a rating to the item or giving a "like" to it. Features comprise multiple parameters available in the system used for generating a user-item relevance prediction. The features can split into two categories—user-specific features and user-nonspecific features Again, broadly speaking, the user-nonspecific features comprise item-related features for items such as for example item-user relevance scores vectors or representation thereof in a form of vectors of item's hidden variables predicted by an SVD algorithm (Singular Value Decomposition). User-nonspecific features may be obtained using a preliminary machine learning algorithm (SVD as an example) different from the main machine learning algorithm used for generating the final prediction of the recommended content for the user. User-nonspecific features may be obtained using several different machine learning algorithms, each generating its respective set of user-nonspecific features. User-nonspecific features may also include various item-specific or system-specific statistics.

User-specific features can comprise for example user-related statistics, estimated characteristics of the user etc., and user-item relevance predictions made in real-time (these predictions may also be generated by a preliminary prediction algorithm such as SVD or the like).

Whereas it is possible to have user-specific features stored for each moment of time and namely for the time of training event happening (in user history for example) or to recalculate them in real-time based on user-related data available for that moment, it can be resource-consuming on the system to have user-nonspecific features for each moment of time in the system and for each time of training event happening, as user non-specific features for each item or system in general are calculated using history of all of the users and/or all the items in the system. Developers of the present technology have appreciated that it can be a computer resource-consuming task to run calculation of user-nonspecific features for each event in the system or for each moment of time. The above identified problem is mitigated by some embodiments of the present technology, where some of the user non-specific features are calculated off-line and are stored in so called snapshot archives.

As such, user-nonspecific features are calculated once in a period of time (once a day or once a week, for example) and are stored in a snapshot archive. User-nonspecific features stored in the snapshot archive are generated using the preliminary machine learning algorithm which is trained on the events which happened prior to the archive generation. User-specific features are calculated in real-time or upon reception of a request for recommendation, so that for each event in the system user-specific features are know for that very moment of the event occurring.

Developers were also set out to mitigate the over-fitting problem. As such, some embodiments of the present technology rely on two principles: (i) using different training sets for training the main prediction algorithm and the preliminary prediction algorithm and (ii) using only features for available at the time of each training event (i.e. no looking forward approach mentioned herein above).

As such, in one aspect, implementations of the present technology provide a method for generating a content recommendation for a given user of a recommendation system. The method is executable at a recommendation server. The method comprises: receiving, by the recommendation server, from an electronic device associated with the given user a request for the content recommendation; responsive to the request generating, by the recommendation server, a set of content recommendations for the given user, the generating being executed by a prediction module of the recommendation server, the prediction module having been trained using a training set of training events, such that for each given training event from the training set of training events: at least one user-nonspecific feature is used as a first input parameter for the prediction module training, the at least one user-nonspecific feature having been retrieved from a latest version of a snapshot archive available at a time of the given training event occurring, the latest version of the snapshot archive having been generated prior to the time of the given training event occurring; at least one user-specific feature is used as a second input parameter for the prediction module training, at least one user-specific feature available at the time of the given training event occurring; transmitting at least a sub-set of the set of content recommendations to the electronic device.

In some implementations of the method, the method further comprises acquiring the at least one user-nonspecific feature.

In some implementations of the method, the acquiring the at least one user-nonspecific feature comprises generating, by a second prediction module, the at least one user-nonspecific feature.

In some implementations of the method, the generating the at least one user-nonspecific feature is executed off-line.

In some implementations of the method, the method further comprises generating the at least user-specific feature.

In some implementations of the method, the generating the at least one user-specific feature is executed in real time at the time of training.

In some implementations of the method, the prediction module training is based on an indication of the training event and the associated at least one user-nonspecific feature and at least one user-specific feature.

In some implementations of the method, at least one user-nonspecific feature comprises a plurality of user-nonspecific features and at least one user-specific feature comprises a plurality of user-specific features and wherein none of the plurality of user-nonspecific features is the same as any of the plurality of user-specific features.

In some implementations of the method, the method further comprises generating the latest version of the snapshot archive and storing the latest version of the snapshot archive in a memory accessible by the recommendations server.

In some implementations of the method, the generating the latest version of the snapshot archive is executed at a point of time after generating a previous version of the snapshot archive and wherein once the latest version of the snapshot archive is generated, its content is used instead of a content of the previous version of the snapshot archive.

In some implementations of the method, the at least one user-specific feature is determined at a point of time after the receiving, by the recommendation server the request for the content recommendation.

In some implementations of the method, the at least one user-nonspecific feature is determined at a point of time before the receiving, by the recommendation server the request for the content recommendation.

In some implementations of the method, the at least one user-specific feature was non-available at the time the latest version of the snapshot archive was generated.

In some implementations of the method, the receiving is executed (i) in response to the user of the electronic device providing an indication of a user-desire to receive content recommendation and (ii) without the user of the electronic device providing an indication of a user-desire to receive content recommendation.

In accordance with another broad aspect of the present technology, there is provided a method of training a prediction module. The prediction module is part of a recommendation server. The method comprises: generating a training set of training events, such that for each given training event from the training set of training events: at least one user-nonspecific feature is used as a first input parameter for the prediction module training, the at least one user-nonspecific feature having been retrieved from a latest version of a snapshot archive available at a time of the given training event occurring, the latest version of the snapshot archive having been generated prior to the time of the given training event occurring; at least one user-specific feature is used as a second input parameter for the prediction module training, at least one user-specific feature available at the time of the given training event occurring; using the training set to train the prediction module to generate an indication of at least one recommendation item.

In some implementations of the method, the at least one user-specific feature was not non-available at the time the latest version of the snapshot archive was generated.

In some implementations of the method, the at least one user-specific feature is generated at the time of the using the training set.

In some implementations of the method, the at least one user-specific feature is generated by a second prediction module of the recommendation server.

In accordance with another broad aspect of the present technology, there is provided a method of training a first prediction module and a second prediction module, the first prediction module and the second prediction module being part of a single recommendation server. An output of the second prediction module is used as an input to the first prediction module. The method comprises: generating a first training set of training events for training the first prediction module, generating a second training set of training events for training the second prediction module, each of the first training set of training events and the second training set of training events including: a respective at least one user-nonspecific feature; and a respective at least one user-specific feature; the respective at least one user non-specific feature and the respective one user specific feature of the first training set being different from the those of the second training set.

In accordance with yet another broad aspect of the present technology, there is provided a server, the server comprising: a processing module configured to: receive from an electronic device associated with the given user a request for the content recommendation; responsive to the request, generate a set of content recommendations for the given user, the generating being executed by a prediction module of the recommendation server, the prediction module having been trained using a training set of training events, such that for each given training event from the training set of training events: at least one user-nonspecific feature is used as a first input parameter for the prediction module training, the at least one user-nonspecific feature having been retrieved from a latest version of a snapshot archive available at a time of the given training event occurring, the latest version of the snapshot archive having been generated prior to the time of the given training event occurring; at least one user-specific feature is used as a second input parameter for the prediction module training, at least one user-specific feature available at the time of the given training event occurring, the at least one user-specific feature being non-available at the time the latest version of the snapshot archive was generated; transmit at least a sub-set of the set of content recommendations to the electronic device.

In some implementations of the server, the processing module being further configured to acquire the at least one user-nonspecific feature.

In some implementations of the server, to acquire the at least one user-nonspecific feature, the processing module is configured cause a second prediction module to generate the at least one user-nonspecific feature.

In some implementations of the server, to generate the at least one user-nonspecific feature, the processing module is configured to generate the at least one user-nonspecific feature off-line.

In some implementations of the server, the processing module being further configured to generate the at least user-specific feature.

In some implementations of the server, to generate the at least one user-specific feature, the processing module is configured to execute generation in real time at the time of training.

In some implementations of the server, the prediction module training is based on an indication of the training event and the associated at least one user-nonspecific feature and at least one user-specific feature.

In some implementations of the server, at least one user-nonspecific feature comprises a plurality of user-nonspecific features and at least one user-specific feature comprises a plurality of user-specific features and wherein none of the plurality of user-nonspecific features is the same as any of the plurality of user-specific features.

In some implementations of the server, the processing module is further configured to generate the latest version of the snapshot archive and to store the latest version of the snapshot archive in a memory accessible by the recommendations server.

In some implementations of the server, to generate the latest version of the snapshot archive, the processing module generates the latest version of the snapshot archive at a point of time after generating a previous version of the snapshot archive and wherein once the latest version of the snapshot archive is generated, its content is used instead of a content of the previous version of the snapshot archive.

In some implementations of the server, the at least one user-specific feature is determined at a point of time after the receiving, by the recommendation server the request for the content recommendation.

In some implementations of the server, the at least one user-nonspecific feature is determined at a point of time before the receiving, by the recommendation server the request for the content recommendation.

In some implementations of the server, the at least one user-specific feature was non-available at the time the latest version of the snapshot archive was generated.

In some implementations of the server, the receiving is executed (i) in response to the user of the electronic device providing an indication of a user-desire to receive content recommendation and (ii) without the user of the electronic device providing an indication of a user-desire to receive content recommendation.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
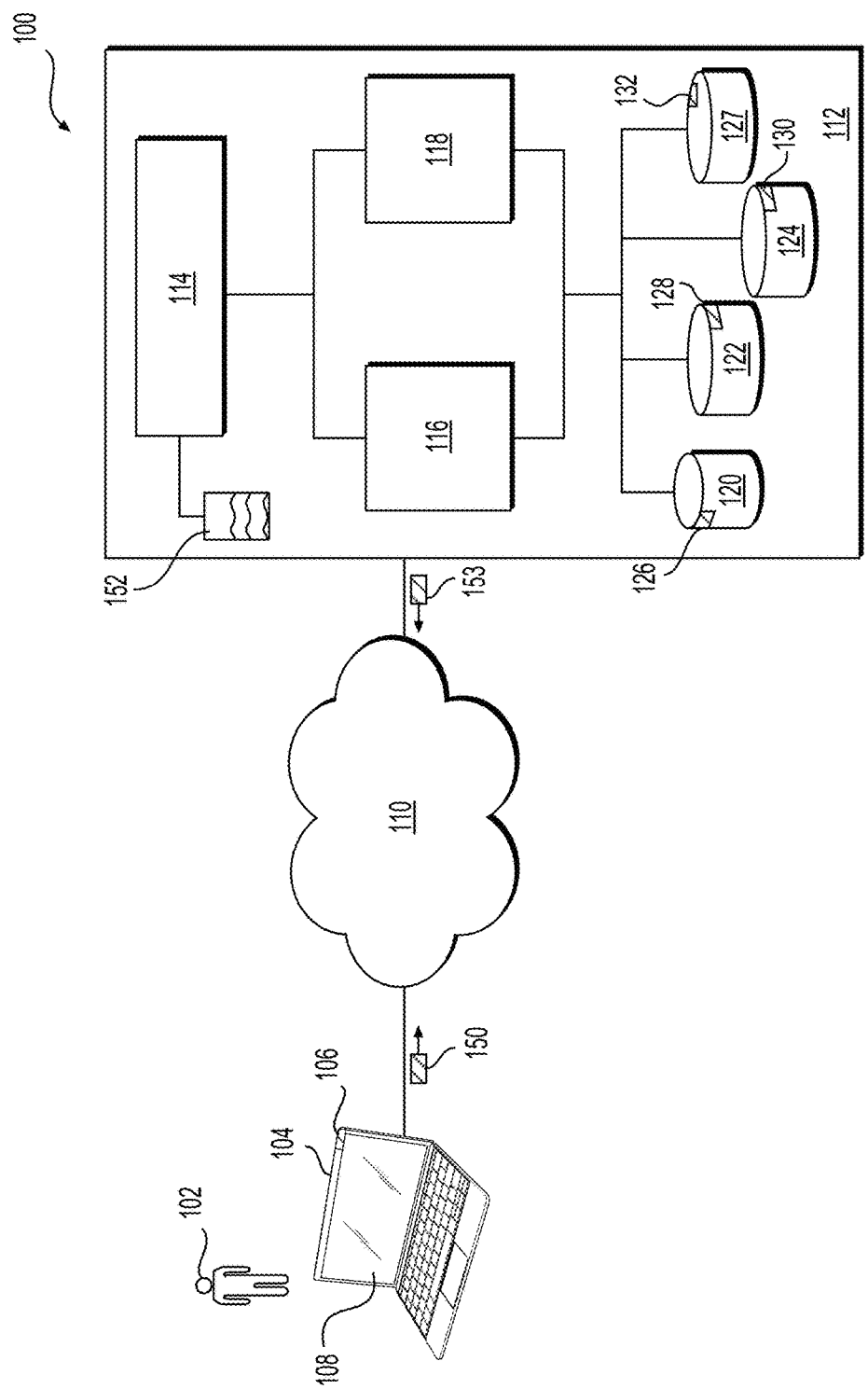
FIG. 1 depicts a system suitable for implementing non-limiting embodiments of the present technology.

Referring to FIG. 1, there is shown a schematic diagram of a system 100, the system 100 being suitable for implementing non-limiting embodiments of the present technology. It is to be expressly understood that the system 100 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

Generally speaking, the system 100 is configured to provide content recommendations to a user 102 of the system 100. The user 102 may be a subscriber to a recommendation service provided by the system 100. However, the subscription does not need to be explicit or paid for. For example, the user 102 can become a subscriber by virtue of downloading a recommendation application from the system 100, by registering and provisioning a log-in/password combination, by registering and provisioning user preferences and the like. As such, any system variation configured to generate content recommendations for the given user can be adapted to execute embodiments of the present technology, once teachings presented herein are appreciated. Furthermore, the system 100 will be described using an example of the system 100 being a recommendation system (therefore, the system 100 can be referred to herein below as a "recommendation system 100" or a "prediction system 100" or a "training system 100"). However, embodiments of the present technology can be equally applied to other types of the systems 100, as will be described in greater detail herein below.

The system 100 comprises an electronic device 104, the electronic device 104 being associated with the user 102. As such, the electronic device 104 can sometimes be referred to as a "client device", "end user device" or "client electronic device". It should be noted that the fact that the electronic device 104 is associated with the user 102 does not need to suggest or imply any mode of operation—such as a need to log in, a need to be registered, or the like.

The implementation of the electronic device 104 is not particularly limited, but as an example, the electronic device 104 may be implemented as a personal computer (desktops, laptops, netbooks, etc.), a wireless communication device (such as a smartphone, a cell phone, a tablet and the like), as well as network equipment (such as routers, switches, and gateways). The electronic device 104 comprises hardware and/or software and/or firmware (or a combination thereof), as is known in the art, to execute a recommendation application 106. Generally speaking, the purpose of the recommendation application 106 is to enable the user to receive (or otherwise access) content recommendations provided by the system 100, as will be described in greater detail herein below.

How the recommendation application 106 is implemented is not particularly limited. One example of the recommendation application 106 may include a user accessing a web site associated with a recommendation service to access the recommendation application 106. For example, the recommendation application 106 can be accessed by typing in (or otherwise copy-pasting or selecting a link) an URL associated with the recommendation service. Alternatively, the recommendation application 106 can be an app downloaded from a so-called app store, such as APPSTORE™ or GOOGLEPLAY™ and installed/executed on the electronic device 104. It should be expressly understood that the recommendation application 106 can be accessed using any other suitable means.

Figure 4:
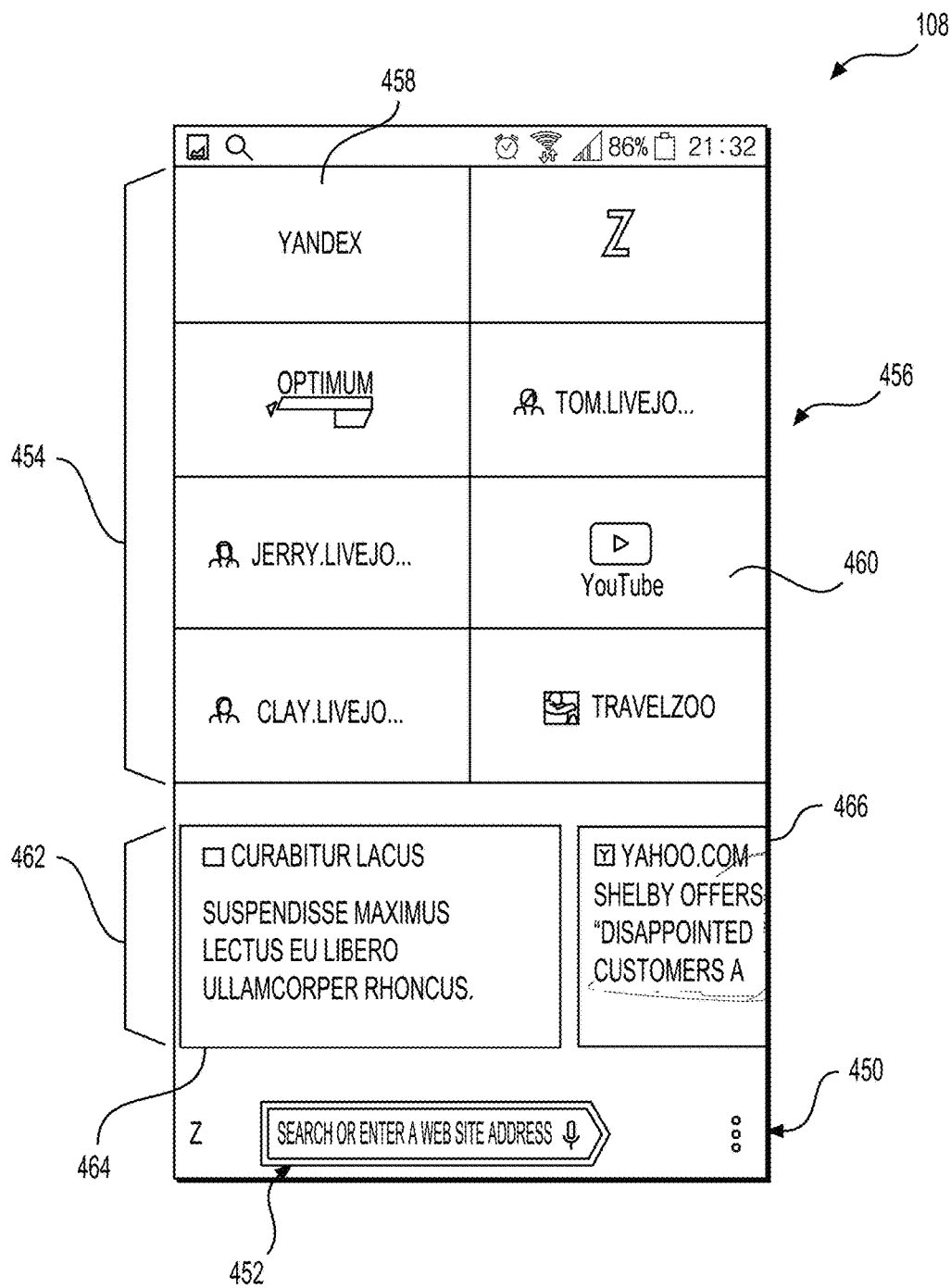
FIG. 4 depicts a screen shot of a recommendation interface implemented in accordance to one non-limiting embodiment of the present technology, the recommendation interface generated on an electronic device associated with a user of the system of FIG. 1.

Generally speaking, the recommendation application 106 comprises a recommendation interface 108, the recommendation interface 108 being displayed on a screen (not separately numbered) of the electronic device 104. With reference to FIG. 4, there is depicted a screen shot of the recommendation interface 108 implemented in accordance to one non-limiting embodiment of the present technology. In some embodiments of the present technology the recommendation interface 108 is actuated when the user 102 of the electronic device 104 actuates (i.e. executes, run, background-run or the like) the recommendation application 106. Alternatively, the recommendation interface 108 can be actuated when the user 102 opens a new browser window and/or activates a new tab in the browser application.

The recommendation interface 108 includes a search interface 450. The search interface 450 includes a search query interface 452. The search query interface 452 can be implemented as an "omnibox" which allows entry of a search query for executing a search or a network address (such as a Universal Remote Locator) for identifying a network resource (such as a web site) to be accessed.

The recommendation interface 108 further includes a links interface 454. The links interface 454 includes a plurality of actuators 456, each of the plurality of actuators 456 having a link to either (i) a web site marked as "favourite" or otherwise marked by the user 102, (ii) a previously visited web site or (iii) the like. The plurality of actuators 456, in the depicted embodiment, is visually presented to the user 102 as square buttons with a logo and/or a name of the resource depicted therein, the logo and the name for enabling the user 102 to identify which resource the particular one of the plurality of actuators 456 is linked to. However, it should be expressly understood that the visual representation of some or all of the plurality of actuators 456 can be different. As such, some or all of the plurality of actuators 456 can be implemented as differently shaped buttons, as hyperlinks presented in a list or the like.

As an example, the plurality of actuators 456 includes inter alia a first actuator 458 and a second actuator 460. The first actuator can be associated with a link to Yandex™ search engine and, to that end, the first actuator 458 has the Yandex search engine logo depicted therein and may be associated with a hyperlink to www.yandex.com, for example. The second actuator 460 can be associated with a link to Youtube™ video sharing service and, to that end, the second actuator 460 has Youtube video sharing logo depicted therein and may be associated with a hyperlink to www.youtube.com, for example. Needless to say, the number and content of the individual ones of the plurality of actuators 456 is not particularly limited.

The recommendation interface 108 further includes a recommended content set 152. The recommended content set 152 includes one or more recommended content items, such as a first recommended content item 464 and a second recommended content item 466. Naturally, the recommended content set 152 can have more (or fewer) than the two items (the first recommended content item 464 and the second recommended content item 466). Within the embodiment depicted in FIG. 4 and in those embodiments where more than one recommended content item are present, the user 102 can scroll through the recommended content set 152. The scrolling can be achieved by any suitable means. For example, the user 102 can scroll the content of the recommended content set 152 by means of actuating a mouse device (not depicted), a key board key (not depicted) or interacting with a touch sensitive screen (not depicted) of or associated with the electronic device 104. In the depicted embodiment of FIG. 4, the user 102 can scroll through the recommended content (i.e. through the first recommended content item 464 and the second recommended content item 466, as well as other recommended content items potentially present in the recommended content set 152) by executing right to left or left to right swipe (or mouse scroll or a key board scroll) action. However, it should be noted that in alternative embodiments, the scrolling through the recommended content can be done in a vertical direction or any other suitable direction.

How the content for the recommended content set 152 is generated will be described in greater detail herein below.

The recommendation interface 108 of FIG. 4 can be thought of as "an overview recommendation screen" in a sense that it provides an overview of recommended items alongside with other content and/or interfaces. More specifically, in the illustrated embodiment, the recommended content set 152 (which allows the user 102 to explore content that the user 102 may not have previously seen or that the user 102 even knows that she/he may be interested in) is presented together with the plurality of actuators 456 (which allows the user 102 to explore the content the user 102 has previously viewed and/or marked as interesting), as well as the search interface 450 (which allows the user 102 to search for resources and/or access resources, such as those resources available on the Internet and the like).

Figure 5:
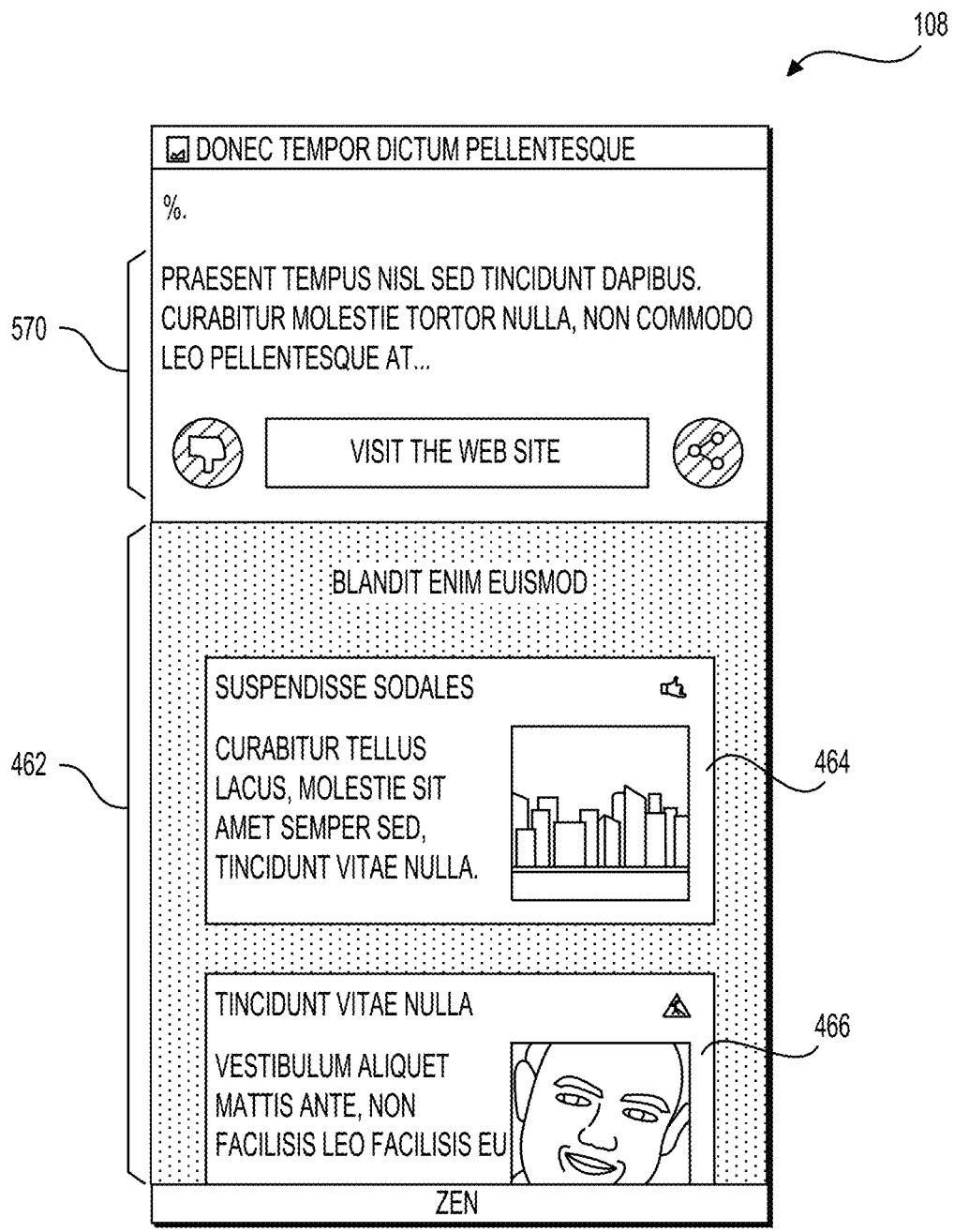
FIG. 5 depicts a screen shot of a recommendation interface implemented in accordance to other non-limiting embodiment of the present technology, the recommendation interface generated on the electronic device associated with a user of the system of FIG. 1.

With reference to FIG. 5, the recommendation interface 108 is depicted in a "recommended content" variation thereof. More specifically, the recommendation interface 108 depicted in FIG. 5 comprises the aforementioned recommended content set 152 that includes the first recommended content item 152 and the second recommended content item 466 (the content thereof being different from that depicted in FIG. 4). In addition to the recommended content set 152, the recommendation interface 108 of FIG. 5 further includes a highlighted recommended item 570, which can be the most relevant/interesting recommended item for the user 102 as selected by the first prediction module 116 and/or second prediction module 118 (to be described herein below).

As one will appreciate, the recommendation interface 108 of FIG. 5 does not include elements that are akin to the plurality of actuators 456 or the search interface 450. Thus, the recommended content variation of the recommendation interface 108 allows the user 102 to browse the recommended content without being "distracted" by other content items (such as favourite links, search interfaces and the like).

Figure 6:
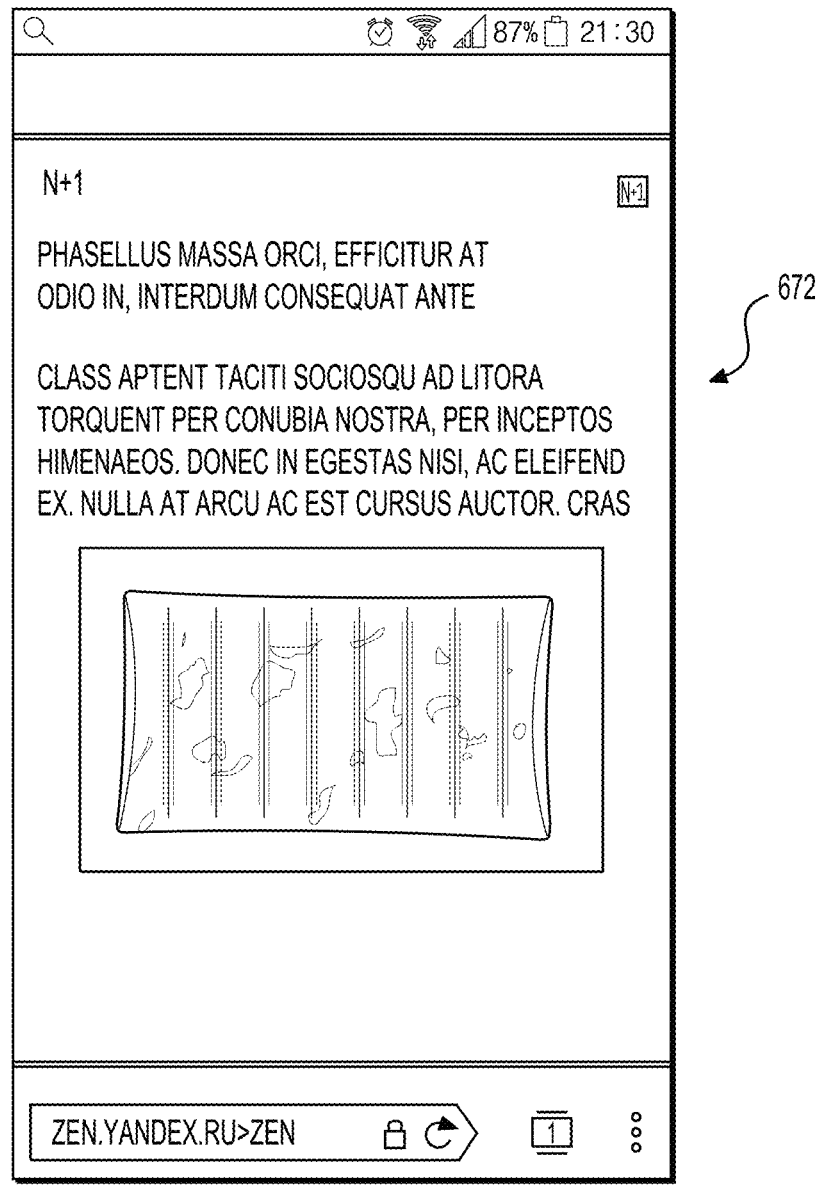
FIG. 6 depicts a screen shot of a recommendation interface implemented in accordance to yet another non-limiting embodiment of the present technology, the recommendation interface generated on the electronic device associated with a user of the system of FIG. 1.

Finally, with reference to FIG. 6, the recommendation interface 108 is depicted in a "recommended content item view" configuration. Within the illustration of FIG. 6, the recommendation interface 108 displays a single recommended item 672. The recommended content item view allows the user 102 to peruse individual recommended content items (such as the content of the single recommended item 672 depicted in FIG. 6).

It is noted that the transition between the views of the recommendation interface 108 between that illustrated in FIG. 4, FIG. 5 and FIG. 6 can be triggered upon user 102 executing a particular action. For example after being presented with the recommendation interface 108 of FIG. 4, upon user clicking in the area generally associated with the recommended items set 152, the electronic device 104 can change presentation of the recommendation interface 108 of FIG. 4 to that of FIG. 5. By the same token, upon the user 102 clicking (or otherwise actuating) a specific one of the recommended items set 152 displayed within the recommendation interface 108 of FIG. 5, the electronic device 104 can change presentation of the recommendation interface 108 of FIG. 4 to that of FIG. 5.

Returning to the description of FIG. 1, the electronic device 104 is communicatively coupled to a communication network 110 for accessing a recommendation server 112. In some non-limiting embodiments of the present technology, the communication network 110 can be implemented as the Internet. In other embodiments of the present technology, the communication network 110 can be implemented differently, such as any wide-area communication network, local-area communication network, a private communication network and the like. A communication link (not separately numbered) between the electronic device 104 and the communication network 110 is implemented will depend inter alia on how the electronic device 104 is implemented. Merely as an example and not as a limitation, in those embodiments of the present technology where the electronic device 104 is implemented as a wireless communication device (such as a smartphone), the communication link can be implemented as a wireless communication link (such as but not limited to, a 3G communication network link, a 4G communication network link, Wireless Fidelity, or WiFi® for short, Bluetooth® and the like). In those examples where the electronic device 104 is implemented as a notebook computer, the communication link can be either wireless (such as Wireless Fidelity, or WiFi® for short, Bluetooth® or the like) or wired (such as an Ethernet based connection).

The server 112 can be implemented as a conventional computer server. In an example of an embodiment of the present technology, the server 112 can be implemented as a Dell™ PowerEdge™ Server running the Microsoft™ Windows Server™ operating system. Needless to say, the server 112 can be implemented in any other suitable hardware, software, and/or firmware, or a combination thereof. In the depicted non-limiting embodiments of the present technology, the server 112 is a single server. In alternative non-limiting embodiments of the present technology, the functionality of the server 112 may be distributed and may be implemented via multiple servers.

The server 112 comprises a processing module 114. The processing module 114 is operatively coupled to a first prediction module 116 and a second prediction module 118. The processing module 114 has access to a first database 120, a second database 122, a third database 124 and a fourth database 127. In the depicted embodiment, the processing module 114 has access to the first database 120, the second database 122, the third database 124 and the fourth database 127 via either one of the first prediction module 116 and the second prediction module 118. However, in alternative embodiments, the processing module 114 can have direct access to some or all of the first database 120, the second database 122, the third database 124 and the fourth database 127.

Furthermore, in the depicted illustration the first database 120, the second database 122, the third database 124 and the fourth database 127 are depicted as separate physical entities. This does not need to be so in each and every embodiments of the present technology. As such, some or all of the first database 120, the second database 122, the third database 124 and the fourth database 127 can be implemented in a single database. Furthermore, any one of the first database 120, the second database 122, the third database 124 and the fourth database 127 can, in itself, be split into several distributed storages.

By the same token, the processing module 114, the first prediction module 116 and the second prediction module 118 are depicted as separate physical entities. This does not need to be so in each and every embodiments of the present technology. As such, some or all of the processing module 114, the first prediction module 116 and the second prediction module 118 can be implemented in a single hardware apparatus. Furthermore, any one of the processing module 114, the first prediction module 116 and the second prediction module 118 can, in itself, be split into several distributed hardware apparatuses.

By the same token, all (or any combination of) the processing module 114, the first prediction module 116, the second prediction module 118, the first database 120, the second database 122, the third database 124 and the fourth database 127 can be implemented in a single hardware apparatus.

The functions of various components of the server 112 will be described in greater details.

The processing module 114 is configured to (i) receive from the electronic device 104 a request for the content recommendation 150 and (ii) responsive to the request, to generate a set of content recommendations 152 specifically customized for the user 102 associated with the electronic device 104. The processing module 114 can further coordinate execution of various routines described herein as performed by the prediction module 116, the second prediction module 118, as well as the first database 120, the second database 122, the third database 124 and the fourth database 127.

In some embodiments of the present technology, the request for the content recommendation 150 can be generated in response to the user 102 providing an explicit indication of the user desire to receive the content recommendation. For example, the aforementioned recommendation interface 108 can provide a button (or another actuatable element) to enable the user 102 to indicate her/his desire to receive a new or an updated content recommendation. As a non-limiting example, the recommendation interface 108 can provide an actuatable button that reads "Request a content recommendation". Within these embodiments, the request for the content recommendation 150 can be thought of as "an explicit request" in a sense of the user 102 expressly providing a request for the recommended content.

In other embodiments, the request for the content recommendation 150 can be generated in response to the user 102 providing an implicit indication of the user desire to receive the content recommendation. In some embodiments of the present technology, the request for the content recommendation 150 can be generated in response to the user 102 starting the recommendation application 106.

In yet further embodiments of the present technology, the request for the content recommendation 150 can be generated even without the user 102 providing either explicit or implicit indication of the user desire to receive the content recommendation. For example, in those embodiments of the present technology where the recommendation application 106 is implemented as a browser (for example, a GOOGLE™ browser, a YANDEX™ browser, a YAHOO!™ browser or any other proprietary or commercially available browser application), the content recommendation 150 can be generated in response to the user 102 opening the browser application and can be generated, for example, without the user 102 executing any additional actions other than activating the browser application. As another example, the content recommendation 150 can be generated in response to the user 102 opening a new tab of the already-opened browser application and can be generated, for example, without the user 102 executing any additional actions other than activating the new browser tab. In other words, the request for the content recommendation 150 can be generated even without the user 102 knowing that the user 102 may be interested in obtaining a content recommendation.

As another example, the content recommendation 150 can be generated in response to the user 102 selecting a particular element of the browser application and can be generated, for example, without the user 102 executing any additional actions other than selecting/activating the particular element of the browser application.

Examples of the particular element of the browser application include but are not limited to:
An address line of the browser application bar
A search bar of the browser application and/or a search bar of a search engine web site accessed in the browser application
An omnibox (combined address and search bar of the browser application)
A favourites or recently visited network resources pane
Any other pre-determined area of the browser application interface or a web resource displayed in the browser application In some embodiments of the present technology, the first prediction module 116 and the second prediction module 118 can both execute a respective machine learning algorithm. However, it should be understood that the first prediction module 116 and the second prediction module 118 do not necessarily need to implement the same machine learning algorithm, although they could. It should also be understood that one or both of the first prediction module 116 and the second prediction module 118 can be configured to execute the various routines described herein without the use of machine learning algorithms.

In some embodiments of the present technology the first prediction module 116 can execute any suitable supervised machine learning algorithm, such as but not limited to:
Artificial neural network
Bayesian statistics
Gaussian process regression
Decision trees
And the like The second prediction module 118 can implement a Singular Value Decomposition (SVD) algorithm. Needless so say, the second prediction module 118 can implement any other suitable algorithm.

Figure 2:
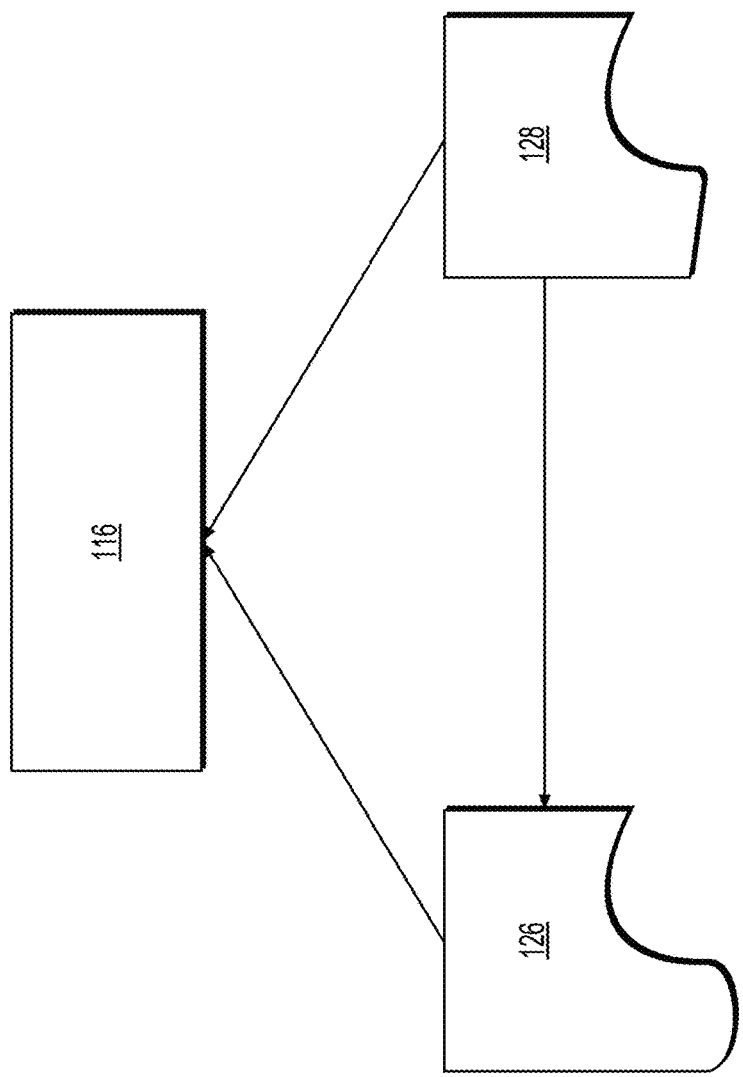
FIG. 2 depicts a schematic representation of a processing module, a first prediction module and a second prediction module of the system of FIG. 1.

With reference to FIG. 2, there is depicted a schematic representation of the processing module 114, the first prediction module 116 and the second prediction module 118, all implemented in accordance with non-limiting embodiments of the present technology. FIG. 2 will now be used to describe an example interaction between the processing module 114, the first prediction module 116 and the second prediction module 118.

In some embodiments of the present technology, the first prediction module 116 can be thought of as a "main prediction module" in a sense that the first prediction module 116 can generate the list of items to be recommended, while the second prediction module 118 can be thought of as a "secondary prediction module" or a "preliminary prediction module" in a sense that the second prediction module 118 generates certain features that can be used for training and/or as an input to the first prediction module 116. For example, the second prediction module 118 can generate one or more user-nonspecific features 128 that can be used for training the first prediction module 116. In some embodiments of the present technology, both the first prediction module 116 and the second prediction module 118 can be used for generating certain features, in use (i.e. when predicting/generating content to be recommended to the user 102).

It is noted that in those embodiments where the first prediction module 116 and the second prediction module 118 implement their respective machine learning algorithms, each of the first prediction module 116 and the second prediction module 118 need to be trained using their respective training data sets. In some embodiments of the present technology, the processing module 114 uses different training sets for training the respective one of the first prediction module 116 and the second prediction module 118.

For example, where the second prediction module 118 generates input to the first prediction module 116 (as an input to the training, as an example), the first prediction module 116 is trained using a different set of training events than those used for training the second prediction module 118. For example, where the processing module 114 has generated certain features as part of the training set for training the second prediction module 118 and whereas the second prediction module 118 is used to generate certain inputs to the first prediction module 116, the features used as part of the training set for the second prediction module 118 are not used as part of the training set for the first prediction module 116.

The first database 120 is configured to store at least one user-specific feature 126 associated with at least one user, such as the user 102. Examples of the user-specific features 126 include but are not limited to:
The number of known events in a log associated with the user 102
A proportion of each type of the event in the log associated with the user 102, such as for example: 50% of events were listening to the track, 40% of events were skips, 5% of the events were likes and 5% of the events were dislikes)
How long the system has kept the log associated with the user 102 or, in other words, time elapsed since an earliest event associated with the user 102
Last time the user 102 was active or, in other words, time elapsed since a latest event associated with the user 102
A preliminary algorithm predicted feature (this feature can be a hybrid—in the sense of being generated based on the user-specific knowledge and an item-specific knowledge)
How many times the user 102 listened to tracks of a given album (also object-related)
The last time the user 102 listened to any track associated with the performer (also object-related)

The second database 122 is configured to store at least one user-nonspecific feature 128 associated with, for example, at least one item with which at least one user, such as the user 102, can interact using the electronic device 104. Examples of such items can include but are not limited to: a web site, a song to be streamed or downloaded from a network resource, a document downloaded from a network resource, a Search Engine Result Page (SERP) and the like.

Examples of the user-nonspecific features 128 include but are not limited to:
General popularity of a given object (for example, in case of the given object being a music track, how many this given music track was listened to/downloaded by all users)
A proportion of likes/purchases/downloads/clicks amongst all events associated with the given object
Object-inherent characteristics—in case of the object being a music track—length of the track, the genre of the track, audio-characteristic of the track (for example, tempo of the track); other object-inherent characteristics include: the price of the object, the dimensions of the object, the category of the object, the producer/maker of the object, the length of the document measured in words or symbols; category/theme of the document; movie rating on a movie rating host, etc.

The third database 124 is configured to store an indication of one or more potentially recommendable content items 130. The nature of the one or more recommendable content items 130 is not particularly limited. Some examples of the one or more recommendable content items 130 include but are not limited to:

A news item

A publication

A web resource

A post on a social media web site

A new item to be downloaded from an application store

A new song to play/download on a content hosting resource

A new movie to play/download on a content hosting resource

A new document uploaded for viewing on a social media web site (such as a new photo uploaded to an INSTA-GRAM or FACEBOOK account)

The fourth database 127 is configured to store an indication of one or more user events 132 (associated with the user 102, as well as other users potentially present in the system 100). Naturally, the indication of one or more user events 132 can be stored in an encrypted form. Examples of the user events 132 include but are not limited to:

User 102 listening to a particular track

User 102 "liking" the particular track, an album associate with the particular track and/or an artist performing the particular track User 102 was presented with a particular resource as part of the recommended content set User 102 has clicked on (or otherwise selected) the particular resource that was recommended as part of the recommended content set User 102 has purchased/ordered/downloaded a particular item from a web resource It should be expressly understood that the user event 132, the user-specific feature 126 and the user-nonspecific feature 128 can take many forms and are not specifically limited. As such, above presented lists of non-limiting examples the way the user event 132, the user-specific feature 126 and the user-nonspecific feature 128 can be implemented are just examples thereof. As such, it should be expressly understood that many other alternative implementations for the user event, the user-specific feature and the user-nonspecific feature.

How the items are obtained and stored in the first database 120, the second database 122, the third database 124 and the fourth database 127 is not particular limited. Some example implementations will be outlined herein below.

For example, the indication of one or more user-specific features 126 can be obtained from user search logs, user logs associated with user interactions with a particular service, user browser logs and the like; and stored in the first database 120. The information representative the one or more user-specific features 126 can be stored in an encrypted form.

For example, the indication of one or more user-nonspecific features 128 can be obtained from the particular service that maintains information about various objects available therefrom and the like; and stored in the second database 122. The information representative various objects can be divided into various categories representative of various types of objects.

For example, the indication of one or more user events 132 can be obtained from the particular service that maintains information about various objects available therefrom and user-interactions with the various objects and the like; and stored in the third database 124.

For example, the indication of one or more items to be recommended 130 can be obtained from the particular service that maintains a list of existing and/or newly available items (for example, on-line media streaming resources, on-line media downloading resources, etc), from social media networks that the user 102 (and other users) subscribe to, news resources and the like.

Figure 3:
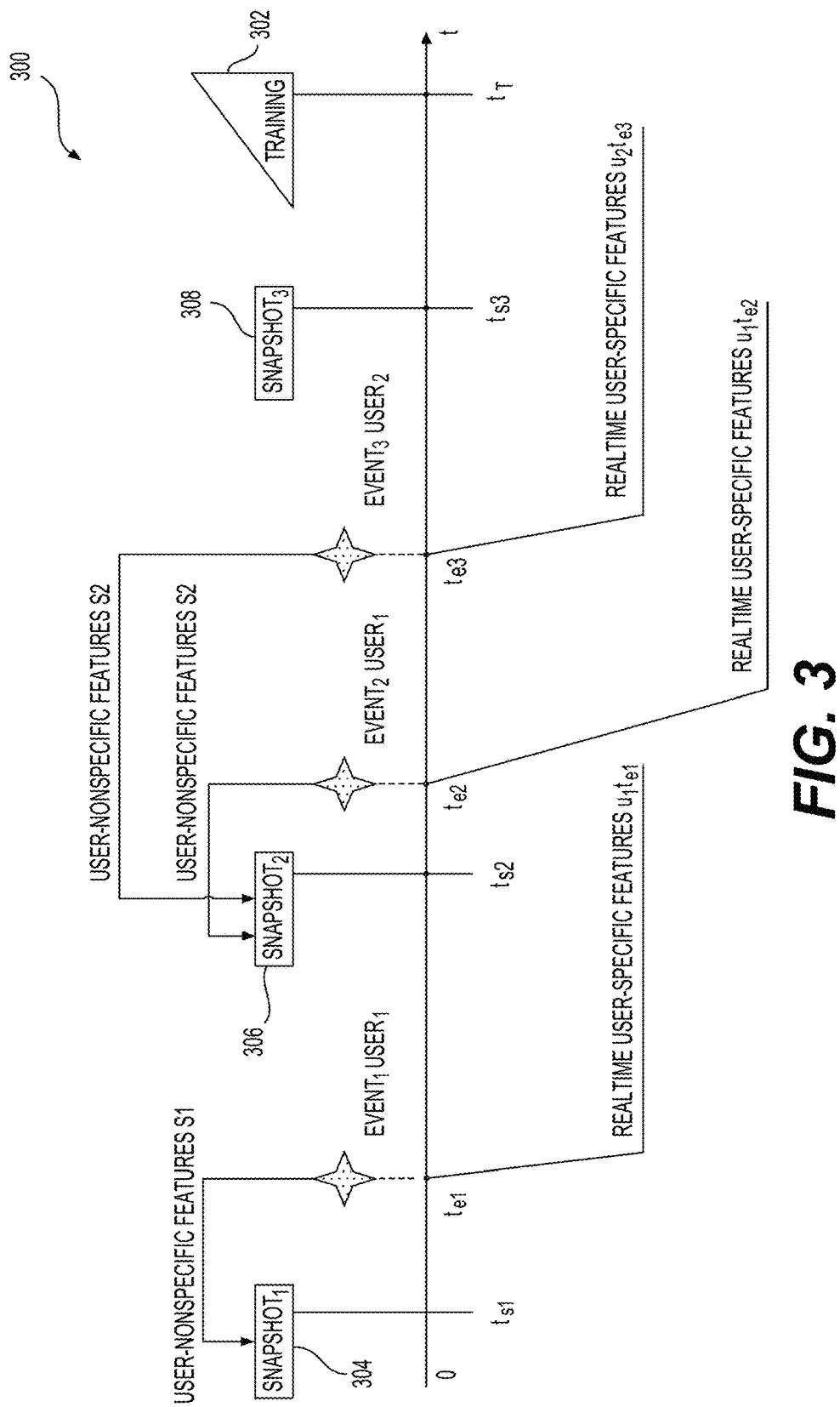
FIG. 3 depicts a schematic illustration of how an archive snapshot archive is generated.

With reference to FIG. 3, there is depicted a schematic illustration of how an archive snapshot can be generated in accordance with various non-limiting embodiments of the present technology. The illustration of FIG. 3 depicts which user-specific features 126 and which user-nonspecific features 128 can be used for training of the first prediction module 116 and/or the second prediction module 118.

Let it be assumed that training 302 of the first prediction module 116 and/or the second prediction module 118 is executed at a point of time $t_T$. At a point of time, prior to the point of time $t_T$, the processing module 114 generates and stores a first snapshot archive 304, a second snapshot archive 306 and a third snapshot archive 308. The processing module 114 generates the first snapshot archive 304, the second snapshot archive 306 and the third snapshot archive 308 at a respective first archive creation time $t_{e1}$, second archive creation time $t_{e2}$ and third archive creation time $t_{e3}$. Chronologically, the third archive creation time $t_{e3}$ occurs after the second archive creation time $t_{e2}$, which in turn occurs after the first archive creation time $t_{e1}$.

In accordance with various non-limiting embodiments of the present technology, each of the first snapshot archive 304, the second snapshot archive 306 and the third snapshot archive 308 contains an indication of one or more user-nonspecific features 128 that are available at the respective creation time of the first snapshot archive 304, the second snapshot archive 306 and the third snapshot archive 308.

It is noted that the number of the snapshot archives has been arbitrarily selected for illustration purposes only. As such, one should expressly understand that the number of the snapshot archives, as well as the frequency of their creation can be selected by those skilled in the art, having appreciated teachings of the technology presented herein. As an example only, a respective one of the first snapshot archive 304, the second snapshot archive 306 and the third snapshot archive 308 can be generated 24 (twenty four) hours after a previous one of the first snapshot archive 304, the second snapshot archive 306 and the third snapshot archive 308 was generated. In other words, the snapshot archives can be generated and stored once a day. In alternative embodiments, a respective one of the first snapshot archive 304, the second snapshot archive 306 and the third snapshot archive 308 can be generated a week after a previous one of the first snapshot archive 304, the second snapshot archive 306 and the third snapshot archive 308 was generated. In other words, the snapshot archives can be generated and stored once a week. Needless to say, any other frequency of regular or non-regular intervals can be used for selecting when the given one of the first snapshot archive 304, the second snapshot archive 306 and the third snapshot archive 308 is generated.

Also, in some embodiments of the present technology, when a sequential one of the first snapshot archive 304, the second snapshot archive 306 and the third snapshot archive 308 is generated, it replaces the previous one of the first snapshot archive 304, the second snapshot archive 306 and the third snapshot archive 308. In alternative embodiments, when a sequential one of the first snapshot archive 304, the second snapshot archive 306 and the third snapshot archive 308 is generated, it is stored in addition to the previous one of the first snapshot archive 304, the second snapshot archive 306 and the third snapshot archive 308. In some of the latter embodiments, the processing module 114 keeps a certain number of past ones of the first snapshot archive 304, the second snapshot archive 306 and the third snapshot archive 308 when a sequential one of the first snapshot archive 304, the second snapshot archive 306 and the third snapshot archive 308 is generated, it replaces the previous one of the first snapshot archive 304, the second snapshot archive 306 and the third snapshot archive 308 on a "first in first out" basis.

In some embodiments of the present technology, a respective one the first snapshot archive 304, the second snapshot archive 306 and the third snapshot archive 308 is created by the processing module 114 using only those user-nonspecific features 128 that were available at the time when the respective one of the first snapshot archive 304, the second snapshot archive 306 and the third snapshot archive 308 is created.

In some embodiments of the present technology, the respective one of the first snapshot archive 304, the second snapshot archive 306 and the third snapshot archive 308 can be generated, at least in part, by the second prediction module 118. In some embodiments of the present technology, the second prediction module 118 can execute a Singular Value Decomposition (SVD) algorithm. Naturally, any other suitable algorithm can be executed by the second prediction module 118. The second prediction module 118 can (i) generate the so-called hidden variables that represent the user-nonspecific feature 128 available at the time of creation of the respective one of the first snapshot archive 304, the second snapshot archive 306 and the third snapshot archive 308 and (ii) store such created values in the respective one of the first snapshot archive 304, the second snapshot archive 306 and the third snapshot archive 308.

On the other hand, in accordance with embodiments of the present technology, generation of the user-specific features 126 can be done in real life or in near-real life. This generation can be done upon occurrence of a particular triggering user event and/or the point in time when training occurs and/or the point of time when the training set is generated. Shown in FIG. 3 are: a first user event $event_1 user_1$, a second user event $event_2 user_1$, and a third user event $event_3 user_2$, that occurred sequentially in time prior to the point of time $t_T$. It should be noted that a type of the user event that can make one of the first user event $event_1 user_1$, the second user event $event_2 user_1$, and the third user event $event_3 user_2$ is not particularly limited. As such one of the first user event $event_1 user_1$, the second user event $event_2 user_1$, and the third user event $event_3 user_2$ can be: the user 102 (or the different user within the system 100) accessing a particular resource, "liking" a particular resource, "disliking" a particular resource, skipping or otherwise abandoning using a particular resource, saving a particular resource and the like.

Just for the purposes of an illustration, let's assume that events tracked within the system 100 is user interaction with an audio track that can be played (i.e. listed to), skipped, "liked", "disliked" and adding to a play list.

Let it further be assumed that the first user event $event_1 user_1$ is associated with the first user (i.e. the user 102) accessing a music hosting service (such as a service that allows the subscribers to download and/or stream various songs for a subscription fee) and browses a list of songs available for download and/or streaming. The first user event $event_1 user_1$ can be the user 102 "liking" a particular new song available for download and/or streaming.

The second user event $event_2 user_1$ can be the user 102 continuing to browse the list of available songs and downloading and/or listening in streaming mode to another particular song.

The third user event $event_3 user_2$ can be the user 102 starting to listen to yet another song, abandoning mid-way, "disliking" the particular song and moving to another song in the list.

According to some embodiments of the present technology, at the time of training 302, the first prediction module 116 and/or the second prediction module 118 are/is trained using a training set, the training set including training items, each training item including (i) an event, (ii) at least one user-specific feature 126 associated with the event and (iii) at least one user-nonspecific feature 128 associated with the event.

In accordance with various embodiments of the present technology, the at least one user-specific feature 126 is generated at the time of the event occurring and/or at the time of training 302. On the other hand, the at least one user-nonspecific feature 128 is extracted from a last version of the snapshot archive (such as one of the first snapshot archive 304, the second snapshot archive 306 and the third snapshot archive 308). A special technical effect attributable at least partially to the use of snapshot archives (such as the first snapshot archive 304, the second snapshot archive 306 and the third snapshot archive 308) can be outlined as ability to save on processing power required to generated the at least one user-nonspecific feature 128 in real-time (or substantially real-time). Recalling that the at least user non-specific feature 128 can be associated with products and, as such, there can be a large number of user non-specific features 128, the use of the snapshot archives (such as the first snapshot archive 304, the second snapshot archive 306 and the third snapshot archive 308) allows for calculating the at least one user-nonspecific feature 128 off-line and to store them in the snapshot archive (such as the first snapshot archive 304, the second snapshot archive 306 and the third snapshot archive 308).

To illustrate the above, it will now be described how the training set is generated using the three events depicted in FIG. 3—namely the first user event $event_1 user_1$, the second user event $event_2 user_1$, and the third user event $event_3 user_2$. When training 302 is executed, the training set is compiled as follows.

For the first user event $event_1 user_1$, the training set includes: an indication of the event associated with the first user event $event_1 user_1$, at least one user-specific feature 126 that was available at the time of the first user event $event_1 user_1$ (i.e. real-time user-specific features $\mu_1 t_{e1}$) and a user-nonspecific feature 128 associated with the first user event $event_1 user_1$ retrieved from the first snapshot archive 304.

For the second user event $event_2 user_1$, the training set includes: an indication of the event associated with the first user event $event_2 user_1$, at least one user-specific feature 126 that was available at the time of the first user event $event_2 user_1$ (i.e. real-time user-specific features $\mu_1 t_{e2}$) and a user-nonspecific feature 128 associated with the first user event $event_2 user_1$ retrieved from the second snapshot archive 306.

For the third user event $event_3 user_2$, the training set includes: an indication of the event associated with the first user event $event_3 user_1$, at least one user-specific feature 126 that was available at the time of the first user event event₃user₁ (i.e. real-time user-specific features $\mu_2 t_{e3}$) and a user-nonspecific feature 128 associated with the first user event event₃user₁ retrieved from the second snapshot archive 306.

Figure 7:
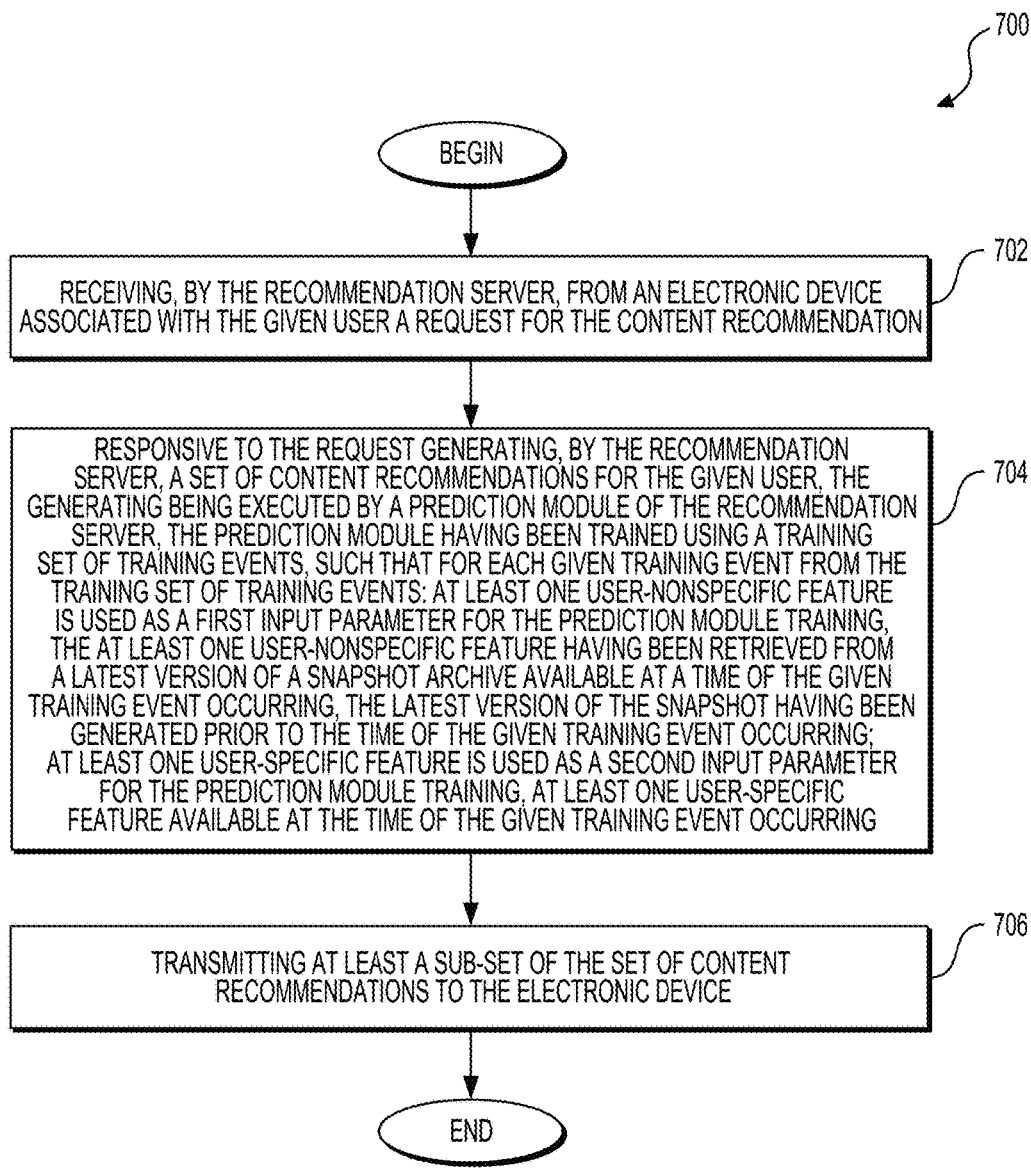
FIG. 7 depicts a block diagram of a method, the method being executable within the system of FIG. 1 and being implemented in accordance with non-limiting embodiments of the present technology.

Given the architecture described above, it is possible to execute a method for generating a content recommendation for a given user 102 of a recommendation system 100. With reference to FIG. 7, there is depicted a block diagram of a method 700, the method being executed by the processing module 114 of the recommendation server 112.

Step 702—receiving, by the recommendation server, from an electronic device associated with the given user a request for the content recommendation The method 700 begins at step 702, where the recommendation server 112 receives, from the electronic device 104 associated with the given user 102 a request for the content recommendation. This is depicted in FIG. 1 as a signal 150 transmitted from the electronic device 104, via the communication network 110, to the recommendation server 112.

The step 704 can be executed (i) in response to the user 102 of the electronic device 104 providing an indication of a user-desire to receive content recommendation and (ii) without the user 102 of the electronic device 104 providing an indication of a user-desire to receive content recommendation.

Step 704—responsive to the request generating, by the recommendation server, a set of content recommendations for the given user, the generating being executed by a prediction module of the recommendation server, the prediction module having been trained using a training set of training events, such that for each given training event from the training set of training events: at least one user-nonspecific feature is used as a first input parameter for the prediction module training, the at least one user-nonspecific feature having been retrieved from a latest version of a snapshot archive available at a time of the given training event occurring, the latest version of the snapshot archive having been generated prior to the time of the given training event occurring; at least one user-specific feature is used as a second input parameter for the prediction module training, at least one user-specific feature available at the time of the given training event occurring, the at least one user-specific feature being non-available at the time the latest version of the snapshot archive was generated Next, at step 704, responsive to the request the recommendation server 112 generates a set of content recommendations 152 for the given user 102. The generation is executed by the processing module 114 of the recommendation server 112, the processing module 114 having been trained using a training set of training events, such that for each given training event from the training set of training events:

at least one user-nonspecific feature is used as a first input parameter for the prediction module training, the at least one user-nonspecific feature 128 having been retrieved from a latest version of a snapshot archive 304, 306, 308 available at a time of the given training event occurring, the latest version of the snapshot archive 304, 306, 308 having been generated prior to the time of the given training event occurring;

at least one user-specific feature 126 is used as a second input parameter for the prediction module training, at least one user-specific feature 126 available at the time of the given training event occurring, the at least one user-specific feature 126 being non-available at the time the latest version of the snapshot archive 304, 306, 308 was generated The first prediction module 116 can generate a prediction as to which content items available from the one or more potentially recommendable content items 130 can be of interest to the user 104. This generation can be based on the machine learning algorithm trained in accordance with non-limiting embodiments of the present technology. The generation of the prediction (i.e. the use of the machine learned algorithm) can utilize user-specific features 126 that are generated at the time of prediction execution and user-nonspecific features 128 that are retrieved from the latest version of the snapshot archive 302, 304, 306 (the user-nonspecific features 128 being associated with the items stored in the one or more potentially recommendable content items 130).

Step 706—transmitting at least a sub-set of the set of content recommendations to the electronic device Next, at step 706, the recommendation server 112 transmits at least a sub-set of the set of content recommendations 152 to the electronic device 104. This is depicted in FIG. 1 as a signal 153 transmitted from the recommendation server 112, via the communication network 110, to the electronic device 104.

The recommendation server 112 transmits at least a sub set (or all) of the selected ones of the one or more potentially recommendable content items 130. How many of the selected ones of the one or more potentially recommendable content items 130 are included in the sub set is not particularly limited. In some embodiments, this value can be a pre-defined value selected by the operator of the system 100. In other embodiments, this value can be selected by the user 102.

In some embodiments of the method 700, the method 700 further comprises acquiring the at least one user-nonspecific feature 128.

In some embodiments of the method 700, the acquiring the at least one user-nonspecific feature 128 comprises generating, by the second prediction module 118, the at least one user-nonspecific feature 128.

In some embodiments of the method 700, the generating the at least one user-nonspecific feature 128 is executed off-line.

In some embodiments of the method 700, the method 700 further comprises generating the at least one user-specific feature 126.

In some embodiments of the method 700, the generating the at least one user-specific feature 126 is executed in real time at the time of training.

In some embodiments of the method 700, the prediction module training is based on an indication of the training event and the associated at least one user-nonspecific feature 128 and at least one user-specific feature 126.

In some embodiments of the method 700, at least one user-nonspecific feature 128 comprises a plurality of user-nonspecific features and at least one user-specific feature 126 comprises a plurality of user-specific features and wherein none of the plurality of user-nonspecific features is the same as any of the plurality of user-specific features.

In some embodiments of the method 700, the method 700 further comprises generating the latest version of the snapshot archive and storing the snapshot archive in a memory accessible by the recommendations server.

In some embodiments of the method 700, the generating the latest version of the snapshot archive 304, 406, 308 is executed at a point of time after generating a previous version of the snapshot archive 304, 406, 308 and wherein once the latest version of the snapshot archive 304, 406, 308 is generated, its content is used instead of a content of the previous version of the snapshot archive 304, 406, 308.

In some embodiments of the method 700, the at least one user-specific feature 126 is determined at a point of time after the receiving, by the recommendation server 112 the request for the content recommendation.

In some embodiments of the method 700, the at least one user-nonspecific feature 128 is determined at a point of time before the receiving, by the recommendation server 112 the request for the content recommendation.

In some embodiments of the method 700, the at least one user-specific feature 126 was non-available at the time the latest version of the latest version of the snapshot archive 304, 406, 308 was generated.

The method 700 then terminates.

Figure 8:
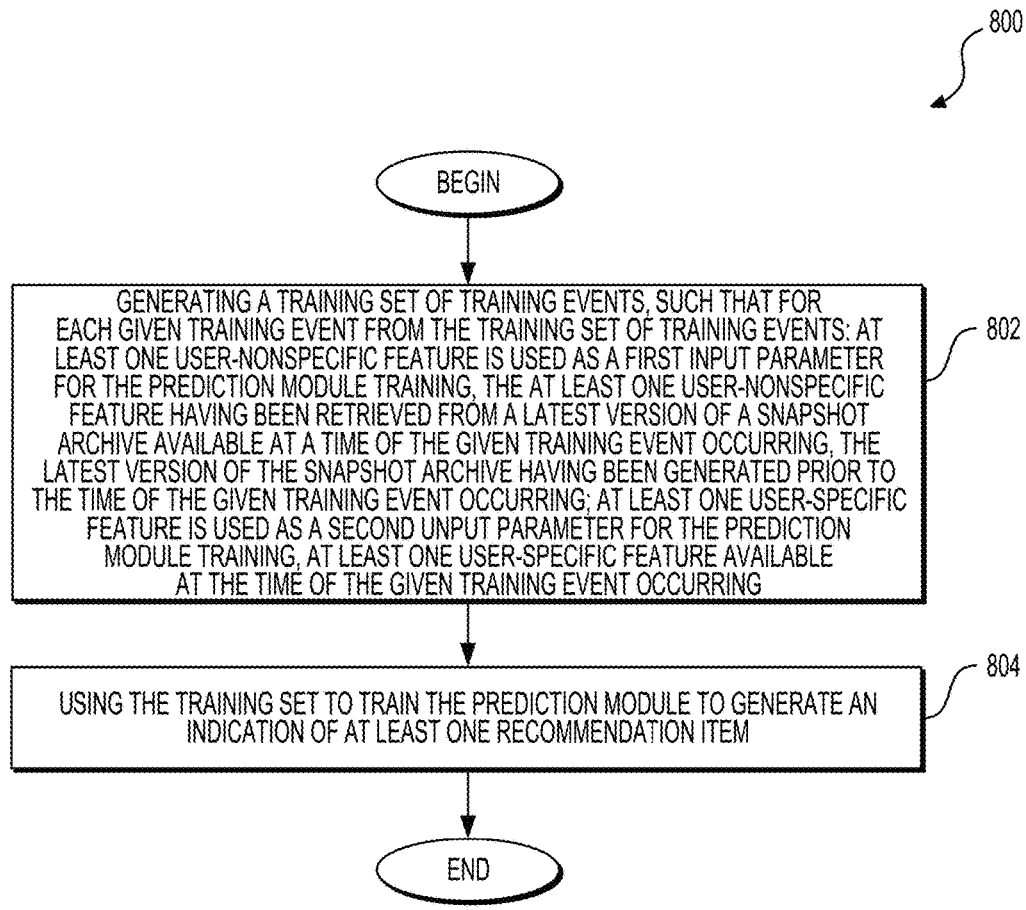
FIG. 8 depicts a block diagram of a method, the method being implemented in accordance with other non-limiting embodiments of the present technology.

With reference to FIG. 8, in accordance with other non-limiting embodiments of the present technology, the processing module 114 can execute a method 800 for training a prediction module (such as one of the first prediction module 116 and the second prediction module 118). FIG. 8 depicts a block diagram of the method 800, the method 800 being implemented in accordance with non-limiting embodiments of the present technology.

Step 802—generating a training set of training events, such that for each given training event from the training set of training events: at least one user-nonspecific feature is used as a first input parameter for the prediction module training, the at least one user-nonspecific feature having been retrieved from a latest version of a snapshot archive available at a time of the given training event occurring, the latest version of the snapshot archive having been generated prior to the time of the given training event occurring; at least one user-specific feature is used as a second input parameter for the prediction module training, at least one user-specific feature available at the time of the given training event occurring The method 800 begins at step 802, where the recommendation server 112 generates a training set of training events, such that for each given training event from the training set of training events: at least one user-nonspecific feature 128 is used as a first input parameter for the prediction module training, the at least one user-nonspecific feature 128 having been retrieved from a latest version of a snapshot archive 304, 306, 308 available at a time of the given training event occurring, the latest version of the snapshot archive 304, 306, 308 having been generated prior to the time of the given training event occurring; at least one user-specific feature 126 is used as a second input parameter for the prediction module training, at least one user-specific feature 126 available at the time of the given training event occurring.

Step 804—using the training set to train the prediction module to generate an indication of at least one recommendation item The method 800 then proceeds to step 804, where the processing module 114 uses the training set to train the prediction module (such as the first prediction module 116 or the second prediction module 118) to generate an indication of at least one recommendation item.

The method 800 then terminates.

Figure 9:
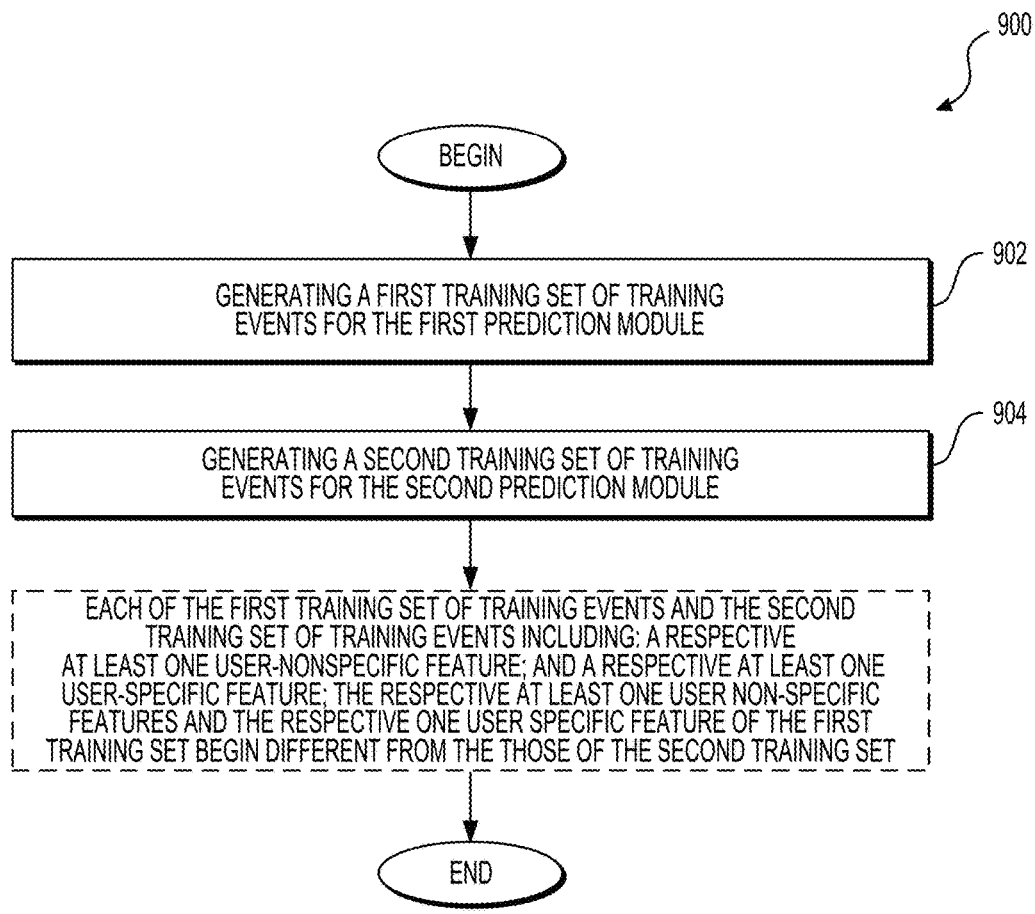
FIG. 9 depicts a block diagram of a method, the method being implemented in accordance with yet another non-limiting embodiment of the present technology.

With reference to FIG. 9, in accordance with other non-limiting embodiments of the present technology, the processing module 114 can execute a method 900 for training the first prediction module 116 and the second prediction module 118, the first prediction module 116 and the second prediction module 118 being part of a single recommendation server 112, an output of the second prediction module 118 being used as an input to the first prediction module 116.

FIG. 9 depicts a block diagram of the method 900, the method 900 being implemented in accordance with non-limiting embodiments of the present technology.

Step 902—generating a first training set of training events for training the first prediction module The method 900 begins at step 902, where the processing module 114 generates a first training set of training events for training the first prediction module 116.

Step 904—generating a second training set of training events for training the second prediction module The processing module 114 then, at step 904, generates a second training set of training events for training the second prediction module 118.

In accordance with embodiments of the present technology, each of the first training set of training events and the second training set of training events including: a respective at least one user-nonspecific feature 128; and a respective at least one user-specific feature 126; the respective at least one user-nonspecific features 128 and the respective at least one user specific feature 126 of the first training set being different from the those of the second training set.

The method 900 then terminates.

Some embodiments of the present technology can lead to a technical effect of a prediction module that is trained on a training set that includes features that are available prior to the training event (i.e. not employing post-occurring features), thus potentially increasing the quality of training and/or prediction, for example, by mitigating over-fitting problem of prior art machine learning algorithms. Some other embodiments of the present technology can lead to a technical effect of a two-step prediction system that has a first module and a second module trained on different training sets and, thus, mitigation of the "biased over-trust" problems of the prior art. Yet some other embodiments of the present technology can lead to a technical effect of a prediction system that uses snapshot archives, thus, potentially reducing the computational power required for real-time (or near real-time) calculations of certain features. Yet some other embodiments of the present technology can lead to a technical effect of ability to calculate certain features offline and store them for later use, thus, reducing the computational power needed for calculating certain features at the training time or at the run time by retrieving certain features from the snapshot archive rather than calculating them in real time or near real time.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

Embodiments of the present technology can be summarized as follows, expressed in numbered clauses.

Clause 1

A method (700) for generating a content recommendation for a given user (102) of a recommendation system (100), the method (700) executable at a recommendation server (112), the method (700) comprising:

receiving (702), by the recommendation server (112), from an electronic device (104) associated with the given user (102) a request (150) for the content recommendation;

responsive to the request generating (704), by the recommendation server (112), a set of content recommendations (152) for the given user (102), the generating (704) being executed by a prediction module (116) of the recommendation server (112), the prediction module (116) having been trained using a training set of training events, such that for each given training event from the training set of training events:

at least one user-nonspecific feature (128) is used as a first input parameter for the prediction module training, the at least one user-nonspecific feature (128) having been retrieved from a latest version of a snapshot archive (304, 406, 308) available at a time of the given training event occurring, the latest version of the snapshot archive (304, 406, 308) having been generated prior to the time of the given training event occurring;

at least one user-specific feature (126) is used as a second input parameter for the prediction module training, at least one user-specific feature (126) available at the time of the given training event occurring;

transmitting (706) at least a sub-set of the set of content recommendations (152) to the electronic device (104).

Clause 2

The method of clause 1, further comprising acquiring the at least one user-nonspecific feature (128).

Clause 3

The method of clause 2, wherein the acquiring the at least one user-nonspecific feature (128) comprises generating, by a second prediction module (118), the at least one user-nonspecific feature (128).

Clause 4

The method of clause 3, wherein the generating the at least one user-nonspecific feature (128) is executed off-line.

Clause 5

The method of clause 1, further comprising generating the at least user-specific feature (126).

Clause 6

The method of clause 5, wherein the generating the at least one user-specific feature (126) is executed in real time at the time of training.

Clause 7

The method of clause 1, wherein the prediction module (116) training is based on an indication of the training event and the associated at least one user-nonspecific feature (128) and at least one user-specific feature (126).

Clause 8

The method of clause 1, wherein at least one user-nonspecific feature (128) comprises a plurality of user-nonspecific features and at least one user-specific feature (126) comprises a plurality of user-specific features and wherein none of the plurality of user-nonspecific features is the same as any of the plurality of user-specific features.

Clause 9

The method of clause 1, further comprising generating the latest version of the snapshot archive (302, 204, 306) and storing the latest version of the snapshot archive (302, 204, 306) in a memory accessible by the recommendations server (112).

Clause 10

The method of clause 9, wherein the generating the latest version of the snapshot archive is executed at a point of time after generating a previous version of the snapshot archive and wherein once the latest version of the snapshot archive is generated, its content is used instead of a content of the previous version of the snapshot archive.

Clause 11 the method of clause 1, wherein the at least one user-specific feature (126) is determined at a point of time after the receiving, by the recommendation server (112) the request for the content recommendation.

Clause 12

The method of clause 1, wherein the at least one user-nonspecific feature (128) is determined at a point of time before the receiving, by the recommendation server (112) the request for the content recommendation.

Clause 13

The method of clause 1, wherein the at least one user-specific feature (126) was non-available at the time the latest version of the snapshot archive (304, 406, 308) was generated.

Clause 14

The method of clause 1, wherein said receiving (702) is executed (i) in response to the user (102) of the electronic device (104) providing an indication of a user-desire to receive content recommendation and (ii) without the user (102) of the electronic device (104) providing an indication of a user-desire to receive content recommendation.

Clause 15

A method (800) of training a prediction module (116, 118), the prediction module (116, 118) being part of a recommendation server (112), the method (800) comprising:

generating (802) a training set of training events, such that for each given training event from the training set of training events:

at least one user-nonspecific feature (128) is used as a first input parameter for the prediction module training, the at least one user-nonspecific feature (128) having been retrieved from a latest version of a snapshot archive (302, 204, 306) available at a time of the given training event occurring, the latest version of the snapshot archive (302, 204, 306) having been generated prior to the time of the given training event occurring;

at least one user-specific feature (126) is used as a second input parameter for the prediction module training, at least one user-specific feature (126) available at the time of the given training event occurring;

using (804) the training set to train the prediction module (116, 118) to generate an indication of at least one recommendation item.

Clause 16

The method of clause 15, wherein the at least one user-specific feature (126) was not non-available at the time the latest version of the snapshot archive (302, 204, 306) was generated.

Clause 17

The method of clause 15, wherein the at least one user-specific feature (126) is generated at the time of the using the training set.

Clause 18

The method of clause 15, wherein the at least one user-specific feature (126) is generated by a second prediction module (118) of the recommendation server (112).

Clause 19

A method (900) of training a first prediction module (116) and a second prediction module (118), the first prediction module (116) and the second prediction module (118) being part of a single recommendation server (112), an output of the second prediction module (118) being used as an input to the first prediction module (116), the method (900) comprising:

generating (902) a first training set of training events for training the first prediction module (116), generating (904) a second training set of training events for training the second prediction module (118), each of the first training set of training events and the second training set of training events including:

a respective at least one user-nonspecific feature (128); and a respective at least one user-specific feature (126);

the respective at least one user non-specific feature (128) and the respective one user specific feature (126) of the first training set being different from the those of the second training set.

Clause 20

A server (112), the server (112) comprising:
a processing module (114) configured to:
receive from an electronic device (104) associated with the given user (102) a request (150) for the content recommendation;

responsive to the request, generate a set of content recommendations (152) for the given user (102), the generating (704) being executed by a prediction module (116) of the recommendation server (112), the prediction module (116) having been trained using a training set of training events, such that for each given training event from the training set of training events:

at least one user-nonspecific feature (128) is used as a first input parameter for the prediction module training, the at least one user-nonspecific feature (128) having been retrieved from a latest version of a snapshot archive (304, 406, 308) available at a time of the given training event occurring, the latest version of the snapshot archive (304, 406, 308) having been generated prior to the time of the given training event occurring;

at least one user-specific feature (126) is used as a second input parameter for the prediction module training, at least one user-specific feature (126) available at the time of the given training event occurring, the at least one user-specific feature (126) being non-available at the time the latest version of the snapshot archive (304, 406, 308) was generated;

transmit (706) at least a sub-set of the set of content recommendations (152) to the electronic device (104).

Clause 21

The server of clause 20, the processing module (114) being further configured to acquire the at least one user-nonspecific feature (128).

Clause 22

The server of clause 21, wherein to acquire the at least one user-nonspecific feature (128), the processing module (114) is configured cause a second prediction module (118) to generate the at least one user-nonspecific feature (128).

Clause 23

The server of clause 22, wherein to generate the at least one user-nonspecific feature (128), the processing module (114) is configured to generate the at least one user-nonspecific feature (128) off-line.

Clause 24

The server of clause 20, the processing module (114) being further configured to generate the at least user-specific feature (126).

Clause 25

The server of clause 24, wherein to generate the at least one user-specific feature (126), the processing module (114) is configured to execute generation in real time at the time of training.

Clause 26

The server of clause 20, wherein the prediction module (114) training is based on an indication of the training event and the associated at least one user-nonspecific feature (128) and at least one user-specific feature (126).

Clause 27

The server of clause 20, wherein at least one user-nonspecific feature (128) comprises a plurality of user-nonspecific features and at least one user-specific feature (126) comprises a plurality of user-specific features and wherein none of the plurality of user-nonspecific features is the same as any of the plurality of user-specific features.

Clause 28

The server of clause 20, the processing module (114) is further configured to generate the latest version of the snapshot archive (302, 204, 306) and to store the latest version of the snapshot archive (302, 204, 306) in a memory accessible by the recommendations server (112).

Clause 29

The server of clause 28, wherein to generate the latest version of the snapshot archive, the processing module (114) generates the latest version of the snapshot archive at a point of time after generating a previous version of the snapshot archive and wherein once the latest version of the snapshot archive is generated, its content is used instead of a content of the previous version of the snapshot archive.

Clause 30

The server of clause 20, wherein the at least one user-specific feature (126) is determined at a point of time after the receiving, by the recommendation server (112) the request for the content recommendation.

Clause 31

The server of clause 20, wherein the at least one user-nonspecific feature (128) is determined at a point of time before the receiving, by the recommendation server (112) the request for the content recommendation.

Clause 32

The server of clause 20, wherein the at least one user-specific feature (126) was non-available at the time the latest version of the snapshot archive (304, 406, 308) was generated.

Clause 33

The server of clause 20, wherein the receiving (702) is executed (i) in response to the user (102) of the electronic device (104) providing an indication of a user-desire to receive content recommendation and (ii) without the user (102) of the electronic device (104) providing an indication of a user-desire to receive content recommendation.

The invention claimed is:

1. A method for generating a content recommendation for a given user of a recommendation system, the method executable at a recommendation server, the method comprising:
   receiving, by the recommendation server, from an electronic device associated with the given user a request for the content recommendation;
   responsive to the request generating, by the recommendation server, a set of content recommendations for the given user, the generating being executed by a prediction module of the recommendation server, the prediction module having been trained using a training set of training events, such that for each given training event from the training set of training events:
      at least one user-nonspecific feature is used as a first input parameter for the prediction module training, the at least one user-nonspecific feature having been retrieved from the latest version of a snapshot archive available at a time of the given training event occurring, the latest version of the snapshot archive having been generated prior to the time of the given training event occurring;
      at least one user-specific feature is used as a second input parameter for the prediction module training the at least one user-specific feature available at the time of the given training event occurring;
   the generating comprising:
      acquiring at least one in-use user non-specific feature from a then latest version of the snapshot archive, the then latest version of the snapshot archive having been generated prior to the generating the set of content recommendations;
      generating an in-use user-specific feature at a moment of time of generating the set of content recommendations;
      using the at least one in-use user non-specific feature and the in-use user-specific feature for generating the set of content recommendations;
   transmitting at least a sub-set of the set of content recommendations to the electronic device.

2. The method of claim 1, further comprising acquiring the at least one user-nonspecific feature.

3. The method of claim 1, wherein the generating the at least one user-nonspecific feature is executed off-line.

4. The method of claim 1, further comprising generating the at least user-specific feature.

5. The method of claim 4, wherein the generating the at least one user-specific feature is executed in real time at the time of training.

6. The method of claim 1, wherein the prediction module training is based on an indication of the training event and the associated at least one user-nonspecific feature and at least one user-specific feature.

7. The method of claim 1, wherein at least one user-nonspecific feature comprises a plurality of user-nonspecific features and at least one user-specific feature comprises a plurality of user-specific features and wherein none of the plurality of user-nonspecific features is the same as any of the plurality of user-specific features.

8. The method of claim 1, further comprising generating the latest version of the snapshot archive and storing the latest version of the snapshot archive in a memory accessible by the recommendations server, and wherein the generating the latest version of the snapshot archive is executed at a point of time after generating a previous version of the snapshot archive and wherein once the latest version of the snapshot archive is generated, its content is used instead of a content of the previous version of the snapshot archive.

9. The method of claim 1, wherein the at least one user-specific feature was non-available at the time the latest version of the snapshot archive was generated.

10. A method of training a prediction module, the prediction module being part of a recommendation server, the method comprising:
   generating a training set of training events, such that for each given training event from the training set of training events:
      at least one user-nonspecific feature is used as a first input parameter for the prediction module training, the at least one user-nonspecific feature having been generated and stored prior to generating the training set, and retrieved from a latest version of a snapshot archive available at a time of the given training event occurring, the latest version of the snapshot archive having been generated prior to the time of the given training event occurring;

at least one user-specific feature is used as a second input parameter for the prediction module training, at least one user-specific feature generated at the time of the given training event occurring;

using the training set to train the prediction module to generate an indication of at least one recommendation item.

11. The method of claim 10, wherein the at least one user-specific feature was not non-available at the time the latest version of the snapshot archive was generated.

12. The method of claim 10, wherein the at least one user-specific feature is generated at the time of the using the training set.

13. The method of claim 10, wherein the at least one user-specific feature is generated by a second prediction module of the recommendation server.

14. A server, the server comprising:
a processing module configured to:
   receive from an electronic device associated with the given user a request for the content recommendation;
   responsive to the request, generate a set of content recommendations for the given user, the generating being executed by a prediction module of the recommendation server, the prediction module having been trained using a training set of training events, such that for each given training event from the training set of training events:
      at least one user-nonspecific feature is used as a first input parameter for the prediction module training, the at least one user-nonspecific feature having been retrieved from a latest version of a snapshot archive available at a time of the given training event occurring, the latest version of the snapshot archive having been generated prior to the time of the given training event occurring;
      at least one user-specific feature is used as a second input parameter for the prediction module training, at least one user-specific feature available at the time of the given training event occurring, the at least one user-specific feature being non-available at the time the latest version of the snapshot archive was generated;
   the generating comprising:
      acquiring at least one in-use user non-specific feature from a then latest version of the snapshot archive, the then latest version of the snapshot archive having been generated prior to the generating the set of content recommendations;
      generating an in-use user-specific feature at a moment of time of generating the set of content recommendations;
      using the at least one in-use user non-specific feature and the in-use user-specific feature for generating the set of content recommendations;
   transmit at least a sub-set of the set of content recommendations to the electronic device.

* * * * *